(12) United States Patent
Pastor

(10) Patent No.: US 12,498,502 B2
(45) Date of Patent: Dec. 16, 2025

(54) TOWED APPARATUS WITH ONE OR MORE WINGS FOR TRANSVERSE GRADIOMETER SURVEYING

(71) Applicant: FNV IP B.V., Leidschendam (NL)

(72) Inventor: Chad Allen Pastor, Lafayette, LA (US)

(73) Assignee: FNV IP B.V., Leidschendam (NL)

( * ) Notice: Subject to any disclaimer, the term of this patent is extended or adjusted under 35 U.S.C. 154(b) by 290 days.

(21) Appl. No.: 18/325,556

(22) Filed: May 30, 2023

(65) Prior Publication Data

US 2024/0402378 A1    Dec. 5, 2024

(51) Int. Cl.
| | |
|---|---|
| *G01V 3/165* | (2006.01) |
| *B63G 8/00* | (2006.01) |
| *B63G 8/18* | (2006.01) |
| *B63G 8/42* | (2006.01) |

(52) U.S. Cl.
CPC ............. *G01V 3/165* (2013.01); *B63G 8/001* (2013.01); *B63G 8/18* (2013.01); *B63G 8/42* (2013.01)

(58) Field of Classification Search
CPC .......... G01V 3/165; G01V 3/15; G01V 3/087; B63G 8/001; B63G 8/18; B63G 8/42; G01R 33/022
See application file for complete search history.

(56) References Cited

U.S. PATENT DOCUMENTS

| | | | |
|---|---|---|---|
| 3,560,912 A * | 2/1971 | Spink et al. ............. | B63G 8/42 244/3 |
| 2012/0026828 A1* | 2/2012 | Fjellstad ................. | B63B 21/66 367/17 |
| 2014/0165898 A1* | 6/2014 | Cierpka .................. | G01S 15/89 114/312 |
| 2018/0043978 A1* | 2/2018 | Fang ........................ | B63G 8/42 |

* cited by examiner

*Primary Examiner* — Tarun Sinha
(74) *Attorney, Agent, or Firm* — Polsinelli PC

(57) ABSTRACT

Described herein are systems and apparatus for transverse gradiometer (TVG) acquisition using a towed platform. A first wing surface that is pitch-adjustable based on rotation about a leading edge of the first wing surface. A second wing surface that is pitch-adjustable based on rotation about a leading edge of the second wing surface, and wherein a pitch of the second wing surface is adjustable independently from a pitch of the first wing surface. Unlocking insights from Geo-Data, the present invention further relates to improvements in sustainability and environmental developments: together we create a safe and livable world.

13 Claims, 10 Drawing Sheets

TOWED APPARATUS WITH ONE OR MORE WINGS FOR TRANSVERSE GRADIOMETER SURVEYING

TECHNICAL FIELD

The present disclosure generally relates to an underwater surveying system and methods of use thereof. For example, aspects of the present disclosure are related to systems and techniques for performing a transverse gradiometer (TVG) survey using a canard wing towed apparatus. Unlocking insights from Geo-Data, the present invention further relates to improvements in sustainability and environmental developments: together we create a safe and livable world.

BACKGROUND

Geophysical surveying can include various underwater surveillance tasks (e.g., sensing, imaging, etc.) that may be performed to track or otherwise detect underwater objects and underwater processes, among various other targets for detection. For example, geophysical surveying can include site characterization and asset integrity marine surveying using magnetometer-based sensing to identify ferrous targets in a marine site or environment. Ferrous targets can include pipelines, cables, debris, unexploded ordnance (UXO), and/or shipwrecks, etc. Magnetometer-based sensing can be used to identify ferrous targets that are on or under the seafloor.

A magnetometer is a sensor device that measures magnetic field or magnetic dipole moment. For instance, different types of magnetometers can be used to measure the direction, strength, or relative change of a magnetic field at a particular location. A single magnetometer may measure the magnetic field at a single location (e.g., the location of the magnetometer sensor apparatus). A magnetic gradiometer is a sensor device that can be used to measure the gradient of magnetic fields. For instance, a magnetic gradiometer can be used to measure the direction and magnitude of magnetic fields. Magnetic gradiometers are pairs of magnetometers with their sensors separated by a known distance. The respective readings from each magnetometer of the pair are subtracted to measure the difference between the sensed magnetic fields, which provides the field gradients caused by magnetic anomalies. For example, magnetic gradiometers are commonly implemented using a first and second magnetometer separated horizontally by a fixed distance, a configuration which is referred to as a transverse gradiometer and/or a horizontal transverse gradiometer.

Underwater surveys that use one or more magnetometer-based sensors (e.g., gradiometers, etc.) are often performed using a minimum separation distance between the magnetometer(s) and the associated surface tow vessel used to perform the survey. The separation distance between a surface tow vessel and its towed survey apparatus is referred to as layback, or layback distance. In some scenarios, a layback distance that is less than three times the length of the tow vessel can result in the magnetic signature of the tow vessel inducing interference, errors, artifacts, inaccuracy, etc., in the survey data collected by a towed gradiometer.

BRIEF SUMMARY

In some examples, systems and techniques are described for a transverse gradiometer (TVG) towed apparatus including two or more wing surfaces for pitch control of the TVG towed apparatus and/or roll control of the TVG towed apparatus. According to at least one illustrative example, a TVG towed apparatus is provided, the apparatus comprising: a tow module comprising at least a tow point coupler. In some examples, the apparatus can also include a planar surface, wherein the planar surface is coupled between a first longitudinal frame arm and a second longitudinal frame arm. The apparatus, in some examples can include a first wing surface disposed on the planar surface (e.g., the first wing surface is pitch-adjustable based on rotation about a leading edge of the first wing surface) and a second wing surface disposed on the planar surface (e.g., the second wing surface is pitch-adjustable based on rotation about a leading edge of the second wing surface). In some aspects, a pitch of the second wing surface is adjustable independently from a pitch of the first wing surface.

In some aspects, the TVG towed apparatus further includes a planar surface coupled between a first longitudinal frame arm and a second longitudinal frame arm. In some aspects, the first wing surface is disposed on the planar surface and the second wing surface is disposed on the planar surface.

In some aspects, the TVG towed apparatus further includes a pitch-adjustable rear wing surface coupled between the first longitudinal frame arm and the second longitudinal frame arm.

In some aspects, the TVG towed apparatus further includes one or more yaw control surfaces pivotably coupled to the planar surface, wherein each yaw control surface of the one or more yaw control surfaces: is perpendicular to the planar surface, is pivotable in a first direction of deflection to yaw the TVG towed apparatus in a first yaw direction, and is pivotable in a second direction of deflection to yaw the TVG towed apparatus in a second yaw direction.

In some aspects, the TVG towed apparatus further includes a first magnetometer coupled to the first longitudinal frame arm and a second magnetometer coupled to the second longitudinal frame arm, wherein the first and second magnetometers are included in a horizontal magnetic gradiometer.

In some aspects, the TVG towed apparatus further includes a first magnetometer towfish rigidly coupled to the first longitudinal frame arm and a second magnetometer towfish rigidly coupled to the second longitudinal frame arm. In some aspects, the first magnetometer towfish is parallel to the first longitudinal frame arm and the second magnetometer towfish is parallel to the second longitudinal frame arm.

In some aspects, the TVG towed apparatus further includes the first magnetometer towfish includes one or more magnetometers disposed within a first towfish housing that includes a first dihedral fin disposed at a first dihedral angle with respect to the planar surface, and the second magnetometer towfish includes one or more magnetometers disposed within a second towfish housing that includes a second dihedral fin disposed at a second dihedral angle with respect to the planar surface.

In some aspects, the TVG towed apparatus further includes that the first dihedral angle is equal to the second dihedral angle.

In some aspects, the TVG towed apparatus further includes the first and second dihedral angles are fixed angles. In some aspects, the first and second dihedral fins are rigidly affixed to the respective first and second magnetometer towfish.

In some aspects, the TVG towed apparatus further includes a pitch-adjustable rear wing surface is rotatably coupled between the first dihedral fin and the second dihedral fin, and wherein rotation of the pitch-adjustable rear wing surface causes a pitch adjustment of the rear wing surface.

In some aspects, the TVG towed apparatus further includes a first rotatable coupler is rigidly affixed to an inner-facing surface of the first dihedral fin, a second rotatable coupler is rigidly affixed to an inner-facing surface of the second dihedral fin, and the pitch-adjustable rear wing surface is rigidly coupled between the first rotatable coupler and the second rotatable coupler.

In some aspects, the TVG towed apparatus further includes a pitch-adjustable rear wing surface is perpendicular to the first and second longitudinal frame arms.

In some aspects, the TVG towed apparatus further includes the first and second wing surfaces are disposed toward the tow module and a pitch-adjustable rear wing surface is disposed away from the tow module.

In some aspects, the TVG towed apparatus further includes a pitch-adjustable rear wing surface has a vertical displacement such that the pitch-adjustable rear wing surface is vertically above the planar surface.

In some aspects, the TVG towed apparatus further includes the first and second wing surfaces are independently pitch-adjustable to control roll of the TVG towed apparatus.

In some aspects, the TVG towed apparatus further includes a pitch-up rotation of the first wing surface causes the TVG towed apparatus to roll in a first direction, and a pitch-up rotation of the second wing surface causes the TVG towed apparatus to roll in a second direction, wherein the second direction is opposite from the first direction.

In some aspects, the TVG towed apparatus further includes the first and second wing surfaces are symmetric about a central longitudinal axis of the TVG towed apparatus, and the first and second longitudinal frame arms are parallel to the central longitudinal axis of the TVG towed apparatus.

In some aspects, the TVG towed apparatus further includes the first wing surface is rotatably coupled to the planar surface by a hinge along the leading edge of the first wing surface, and the second wing surface is rotatable coupled to the planar surface by a hinge along the leading edge of the second wing surface.

In some aspects, the TVG towed apparatus further includes the planar surface includes a first aperture configured to receive the first wing surface such that the first wing surface in a 0-degree pitch configuration is coplanar with the planar surface, and a second aperture configured to receive the second wing surface such that the second wing surface in a 0-degree pitch configuration is coplanar with the planar surface.

In some aspects, the TVG towed apparatus further includes the first and second wing surfaces are adjustable between a pitch angle of −40 degrees to +40 degrees, and wherein the pitch angle is defined relative to the planar surface.

In some aspects, the TVG towed apparatus further includes a deep water configuration where a pitch-adjustable rear wing surface is configured to exert a downward pitching moment on the TVG towed apparatus.

In some aspects, the TVG towed apparatus further includes the first and second wing surfaces are configured to exert respective first and second additional downward pitching moments on the TVG towed apparatus in the deep water configuration.

In some aspects, the TVG towed apparatus further includes the deep water configuration corresponds to an operating depth of the TVG towed apparatus that is greater than 20 meters.

In some aspects, the TVG towed apparatus further includes in a shallow water where a pitch-adjustable rear wing surface is configured to exert an upward pitching moment on the TVG towed apparatus.

In some aspects, the TVG towed apparatus further includes the first and second wing surfaces are configured to exert respective first and second additional upward pitching moments on the TVG towed apparatus in the shallow water configuration.

In some aspects, the TVG towed apparatus further includes the shallow water configuration corresponds to an operating depth of the TVG towed apparatus that is less than 20 meters.

In some aspects, the TVG towed apparatus further includes a pitch of the pitch-adjustable rear wing surface in the shallow water configuration is in an opposite rotational direction from a pitch of the pitch-adjustable rear wing surface in a deep water configuration for exerting a downward pitching moment on the TVG towed apparatus.

In some aspects, the TVG towed apparatus further includes the tow module is coupled between a first distal end of the first longitudinal frame arm and a first distal end of the second longitudinal frame arm, in a transverse direction.

In some aspects, the TVG towed apparatus further includes the tow module is rigidly coupled between the first longitudinal frame arm and the second longitudinal frame arm.

In some aspects, the TVG towed apparatus further includes a center of gravity of the TVG towed apparatus is located towards the tow module.

In some aspects, the TVG towed apparatus further includes the tow point coupler is rigidly affixed to the planar surface and extends to a coupling point that is vertically offset from the planar surface by at least three inches.

In some aspects, the TVG towed apparatus further includes a distance between the planar surface and a coupling point at a distal end of the tow point coupler is greater than a distance between the planar surface and a trailing edge of the first or second wing surfaces in a maximum upward pitch deflection relative to the planar surface.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are therefore not to be considered to be limiting of its scope, the principles herein are described and explained with additional specificity and detail through the use of the accompanying drawings in which.

DETAILED DESCRIPTION

Figure 1:
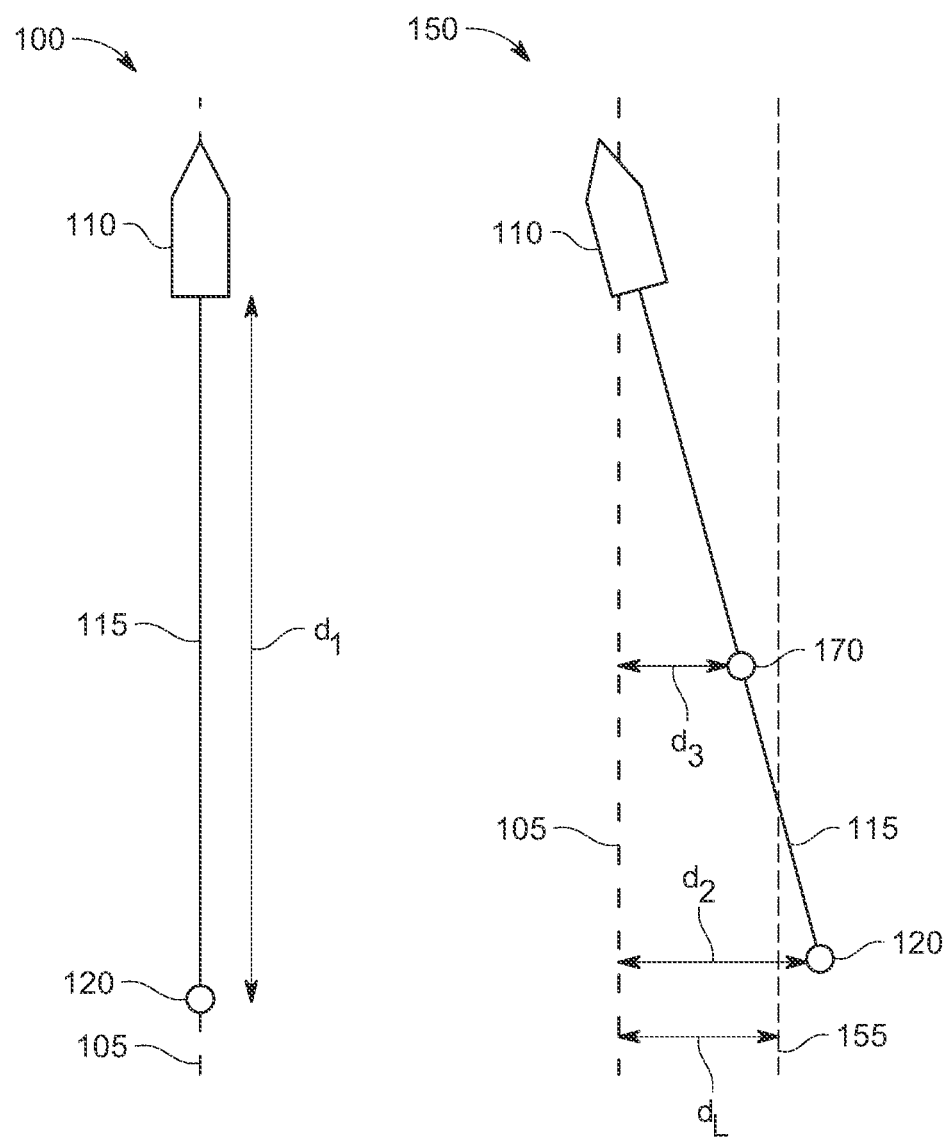
FIG. 1 is a diagram depicting an example of a towed apparatus deployed from a vessel for surveying in a no cross water current condition and an example of a towed apparatus deployed from a vessel for surveying in a high cross water current condition, in accordance with some examples.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the examples described herein. However, it will be understood by those of ordinary skill in the art that the examples described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

As mentioned previously, geophysical surveying can include site characterization and asset integrity marine surveying using magnetometer-based sensing to identify ferrous targets in a marine site or environment (e.g., on the seafloor, under the seafloor, etc.). For instance, ferrous targets can include pipelines, cables, debris, unexploded ordnance (UXO), and/or shipwrecks, etc. A magnetometer is a sensor device that measures magnetic field or magnetic dipole moment. For instance, different types of magnetometers can be used to measure the direction, strength, or relative change of a magnetic field at a particular location. A single magnetometer may measure the magnetic field at a single location (e.g., the location of the magnetometer sensor apparatus). A magnetic gradiometer is a sensor device that can be used to measure the gradient of magnetic fields. For instance, a magnetic gradiometer can be used to measure the direction and magnitude of magnetic fields. Magnetic gradiometers are pairs of magnetometers with their sensors separated by a known distance. The respective readings from each magnetometer of the pair are subtracted to measure the difference between the sensed magnetic fields, which provides the field gradients caused by magnetic anomalies. For example, magnetic gradiometers are commonly implemented using a first and second magnetometer separated horizontally by a fixed distance, a configuration which is referred to as a transverse gradiometer and/or a horizontal transverse gradiometer.

In some cases, a transverse gradiometer (TVG) can be installed into a TVG tow frame that can be deployed (e.g., towed) behind a vessel and used to obtain highly accurate magnetic surveys of a desired area in which the vessel operates to tow the TVG tow frame. For instance, a TVG tow frame can include a pair of magnetometers (e.g., magnetic gradiometer) with a cross track separation of, for example, 1.5 meters (m). In some examples, a vessel deployed TVG tow frame and/or a TVG survey in general may be subject to governmental or other regulatory requirements. For instance, the United States Bureau of Ocean Energy Management (BOEM) requires a TVG for Offshore Wind Farm surveys in US waters.

Conventional TVG tow frames (e.g., also referred to herein as "TVG tow frames") typically have a cable out of 1:6, relative to the water depth. A ratio of 1:6 can indicate that the deployed length of the cable or tether between the vessel and the TVG tow frame is ⅙ the water depth. In some aspects, a layback can refer to the distance separating a tow vessel and a towed apparatus of the vessel (e.g., a TVG tow frame, etc.). For instance, when the towed apparatus flies at a height from the seafloor that is lower than that of the tow vessel/tow point of the tow vessel, the layback distance will be less than the deployed cable length. For example, for a deployed length of tether cable l and an angle θ between the water surface and the tether cable, the layback distance may be given as l*cos θ.

In some scenarios, a short layback can be associated with accuracy and/or interference issues when performing certain types of towed surveys. For instance, a magnetic towed survey (e.g., a gradiometer survey using a TWG tow frame) can experience interference from the magnetic signature of the tow vessel for relatively short layback distances that are less than three times the length of the tow vessel. However, a long layback can be associated with data gap problems and various other issues in certain environmental conditions, such as for TVG surveys performed in high cross water current conditions. For example, FIG. 1 is a diagram depicting an example 100 of towed apparatus surveying in the absence of a cross water current condition (e.g., no cross water current condition) and an example 150 of towed apparatus surveying in a high cross water current condition. In one illustrative example, a vessel 110 is used to tow an example towed survey apparatus 120 (e.g., such as a TVG tow frame). A cable or tether 115 is used to couple or otherwise connect the towed survey apparatus 120 to the vessel 110. As shown in the no cross water current condition example 100 (e.g., on the left-hand side of FIG. 1), the cable or tether 115 is deployed to a layback distance of $d_1$ (e.g., the distance $d_1$ separates the vessel 110 and the towed survey apparatus 120) In the no cross water current condition example 100, the towed survey apparatus 120 remains approximately aligned with axis 105, which can represent a central longitudinal axis of vessel 110, a direction of travel of vessel 110, an intended survey track to be performed by vessel 110 and towed survey apparatus 120, etc. In the no cross water current condition example 100, the cable 115 is deployed to be substantially parallel to the axis 105.

In the high cross water current condition example 150 (e.g., shown on the right-hand side of FIG. 1), the relatively high cross water current(s) cause one or more of vessel 110 and/or towed survey apparatus 120 to deviate away from the axis 105. For instance, in the example 150 shown in FIG. 1, a high cross water current from left to right can push the vessel 110 and towed survey apparatus 120 off track relative to axis 105. In some scenarios, a towed survey apparatus must operate within or under a threshold limit of cross-track deviation, shown in FIG. 1 as an axis 155 having a lateral offset d from the axis 105 associated with the vessel 110 and towed survey apparatus 120. For instance, BOEM requirements provide a 22-meter limit of maximum cross-track separation between a vessel 110 and towed survey apparatus 120 (e.g., TVG tow frame), and in some examples the cross-track threshold limit 155 may correspond to a lateral offset $d_L$=22 m. However, in the example 150 depicted in FIG. 1, the relatively high cross water current conditions, combined with the cable 115 and layback distance $d_1$, may cause the towed survey apparatus 120 to experience a cross-track separation distance of $d_2$ that is greater than the cross-track separation threshold or limit $d_L$. For instance, continuing in the example above where the cross-track limit is given as $d_1$=22 m (e.g., BOEM limit), the towed survey apparatus 120 may experience a high cross water current condition cross-track separation of $d_2$=30 m (e.g., relative to the axis 105 and the position of the towed survey apparatus 120 in the no cross water current condition example 100).

Accordingly, there is a need for systems and techniques that can be used to perform marine and geophysical surveying with a towed survey apparatus (e.g., TVG tow frame) that is configured to reduce the cross-track separation, including in relatively high cross water current conditions.

There is a further need for systems and techniques that can be used to perform towed apparatus surveying (e.g., TVG surveying) with a cross-track separation that is less than the 22 m BOEM limit (e.g., among various other limits or thresholds for cross-track separation). As will be described in greater depth below, described herein are systems and techniques that can be used to implement a TVG tow frame with independently pitch-adjustable canard wings for reducing cross-track separation. In one illustrative example, the presently disclosed canard wing TVG tow frame can be configured to achieve a cross-track separation shown as the distance $d_3$ in the same high cross water condition example 150 of FIG. 1. For instance, the presently disclosed canard wing TVG tow frame may achieve a cross-track separation of approximately 14 m or less (e.g., $d_3$=14 m), thereby remaining under the 22 m BOEM limit in the same scenario where a conventional TVG tow frame exceeds the 22 m BOEM limit (e.g., the presently disclosed canard wing TVG tow frame 170 shown with a cross-track separation of 14 m<22 m BOEM limit 155 vs. the conventional TVG tow frame 120 shown with a cross-track separation of 30 m>22 m BOEM limit 155).

Figure 2:
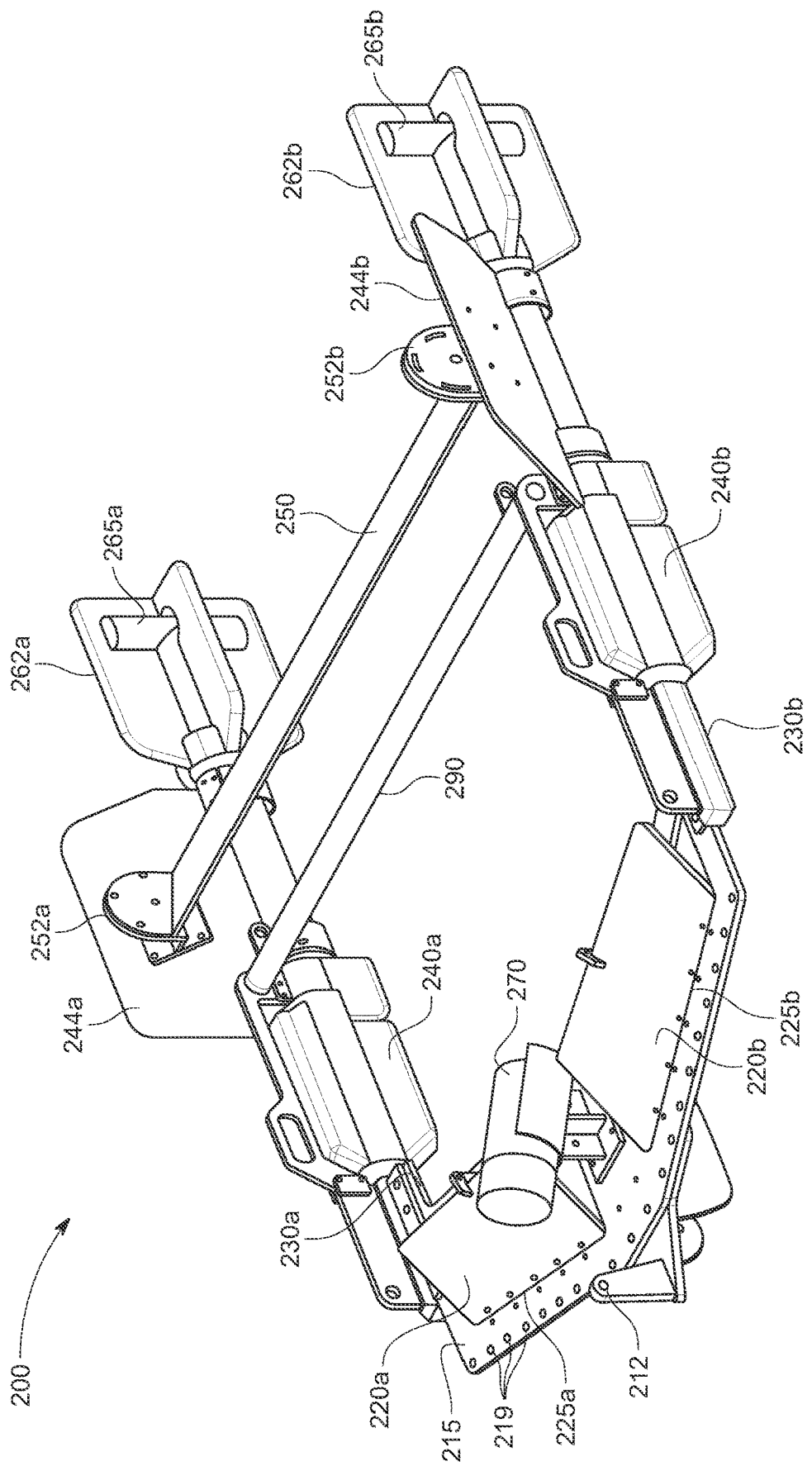
FIG. 2 is a perspective view of an example TVG towed apparatus with canard wings rotated to a first pitch adjustment position associated with a first pitch adjustment direction, in accordance with some examples.

FIG. 2 is a perspective view of an example TVG towed apparatus 200 with canard wings, in accordance with some examples. In particular, the perspective view of FIG. 2 shows the TVG towed apparatus 200 with a pair of independently pitch-adjustable canard wings 220a, 2020b rotated to a first pitch adjustment position associated with a first pitch adjustment direction. For instance, the canard wings 220a, 220b are shown as rotated to a first pitch adjustment position in an upward direction relative to a planar surface 215 of the TVG towed apparatus 200. A second pitch adjustment direction can be provided in the opposite direction of the first pitch adjustment direction (e.g., the first pitch adjustment direction being an upward deflection relative to the plane of the planar surface 215, and the second pitch adjustment direction being a downward deflection relative to the plane of the planar surface 215, or vice versa).

The canard wings 220a, 220b can be included in, associated with, and/or otherwise coupled to the planar surface 215. For instance, the canard wings 220a, 220b can be provided in two corresponding receiving apertures (e.g., holes or openings) of the planar surface 215, via a hinged attachment to the planar surface 215 along the respective leading edge 225a, 225b of each canard wing 220a, 220b. As used herein, the planar surface 215 may also be referred to as a "frame wing." In some aspects, the term "frame wing" can refer to the combination of the planar surface 215 and the canard wings 220a, 220b. In some embodiments, the planar surface 215 may be included in the "frame wing," but is not used to generate lift. In some aspects, the planar surface 215 may generate a relatively small amount of lift relative to the amount of lift that can be generated by either (or both) of the canard wings 220a, 220b. For instance, in a 0-deflection position in which the canard wings 220a, 220b are co-planar with planar surface 215, the "frame wing" comprising the planar surface 215 and canard wings 220a, 220b may generate no lift or substantially little lift. In one illustrative example, the canard wings 220a, 220b may also be referred to as "front wings." In at least some embodiments, the canard wings 220a, 220b are a primary lift generating component of the TVG tow frame 200 (e.g., the canard wings 220a, 220b may generate greater lift force(s) than a rear spar wing 250, described in greater detail below).

In some embodiments, the presently disclosed TVG canard wing (e.g., the TVG towed apparatus 200 and/or various other TVG towed apparatuses described herein) can be seen to reduce the survey vessel time associated with TVG surveys conducted in deep water operations (e.g., a water depth of 20 m or greater). For instance, the TVG towed apparatus can be configured with one or more of the canard wings 220a, 220b and/or the rear spar wing 250 in a "dive down" configuration that causes the TVG towed apparatus to dive or fly down to a greater depth within the water. Notably, based at least in part on the TVG towed apparatus remaining tethered to the tow vessel on the surface during the dive down operation, the TVG towed apparatus moves closer to the tow vessel (e.g., reduces layback) by diving down. Accordingly, deep water survey times can be decreased based at least in part on the significantly reduced layback distances that can be achieved by using the presently disclosed TVG towed apparatus in a dive down configuration.

Additionally, the presently disclosed TVG canard wing can be seen to simplify the work associated with TVG surveys conducted in shallow water operations (e.g., a water depth of 20 m or less). For instance, the TVG towed apparatus can be configured with one or more of the canard wings 220a, 220b and/or the rear spar wing 250 in a "dive up" configuration that causes the TVG towed apparatus to decrease its depth and move closer to the water surface. Notably, based at least in part on the TVG towed apparatus remaining tethered to the tow vessel on the surface during the dive up operation, the TVG towed apparatus can be seen to simultaneously improve operational safety (e.g., reducing the likelihood of collision with the seafloor in the shallow water depths <20 m) and to increase layback from the tow vessel. Increasing layback can be needed in shallow water TVG survey operations because a layback distance that is less than three times the length of the tow vessel can result in magnetic interference (e.g., from the metal or ferrous mass of the tow vessel) in the magnetometer readings collected by the towed TVG survey apparatus. In some aspects, the presently disclosed TVG canard wing (e.g., the TVG towed apparatus 200 and/or various other TVG towed apparatus described herein) can be designed for use on Unmanned Surface Vessels.

In some examples, the canard wings 220a, 220b can be independently adjustable from one another. For instance, the first canard wing 220a can be configured with a pitch adjustment having a different magnitude or pitch adjustment position than that of the second canard wing 220b, can be configured with a pitch adjustment having a different pitch adjustment direction than that of the second canard wing 220b, or both. The independently pitch-adjustable canard wings 220a, 220b may also be adjusted in tandem, such that both canard wings 220a, 220b undergo the same pitch adjustment in the same pitch adjustment direction.

Figure 4:
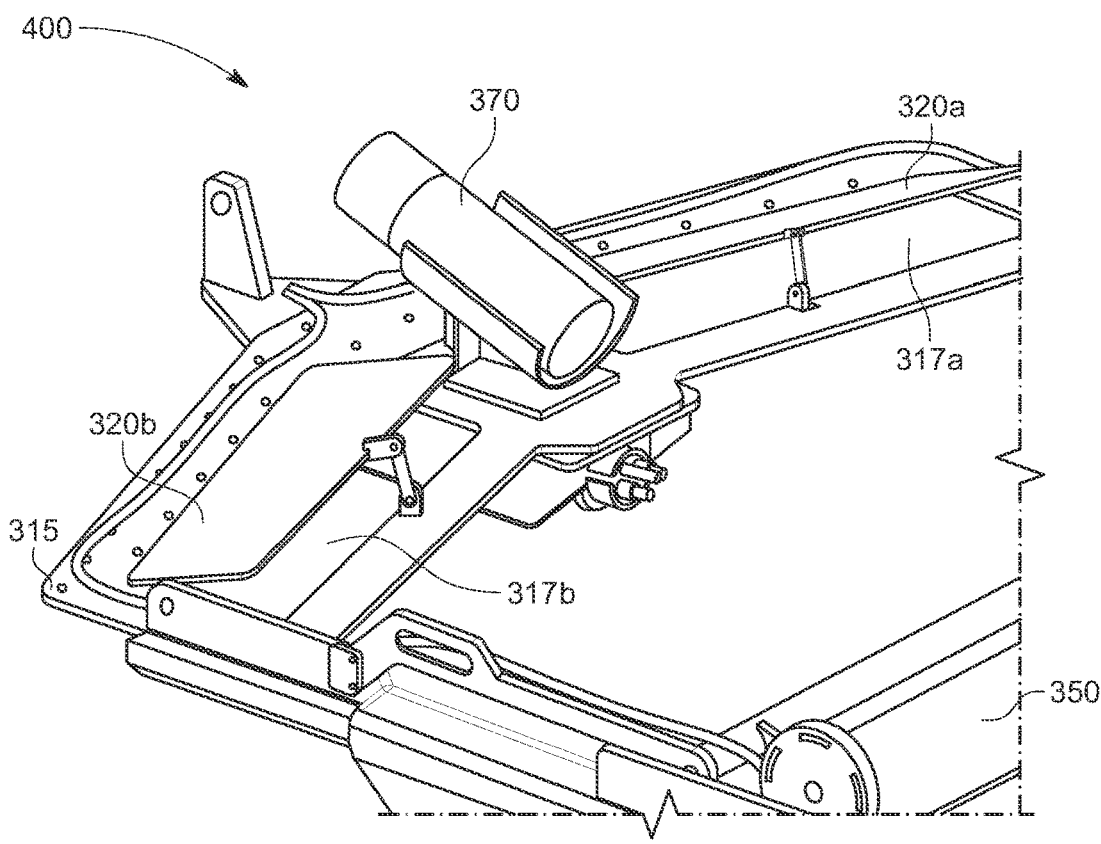
FIG. 4 is a side perspective view of the example TVG towed apparatus of FIG. 3, with canard wings rotated to another pitch adjustment position associated with the first pitch adjustment direction, in accordance with some examples.

In some embodiments, one or more (or both) of the canard wings 220a, 220b can be adjusted using a corresponding mechanical standoff associated with each canard wing 220a, 220b, respectively. For instance, as shown in FIG. 4, a mechanical standoff (among various other pitch adjustment mechanisms for the canard wings) can be coupled between the planar surface 215 and the trailing edge of each canard wing 220a, 220b. By increasing the length of the mechanical standoff, the deflection of the canard wing can be increased (e.g., increasing the length of the mechanical standoff increases the vertical separation between the canard wing trailing edge and planar surface 215, resulting in deflection of the canard wing based on the hinged attachment between the leading edge of the canard wing and the planar surface).

In some aspects, a desired deflection and/or dive configuration of one or both of the canard wings 220a, 220b can be set prior to deploying the canard wing 220a, 220b into the water. For instance, the desired deflection or dive configuration of each canard wing 220a, 220b can be adjusted onboard the tow vessel, prior to deploying the TVG towed apparatus 200 into the water. In another illustrative example, one or both of the canard wings 220a, 220b can include an actuator for continuous control of a deflection angle and position of the respective canard wing 220a, 220b relative to the planar surface 215. In some aspects, a canard wing that is pitch adjusted using a continuous actuator can be configured as desired prior to deployment (e.g., as described above with respect to the use of mechanical standoffs), and may additionally be configured (and/or rec-configured, adjusted, etc.) after deployment of the TVG tow frame 200 into the water.

In one illustrative example, the canard wings 220a, 220b can be used to correct for roll problems of the TVG towed apparatus. For instance, one (or both) of the canard wings 220a, 220b can be used to correct a roll bias of the TVG towed apparatus 200. A roll bias to the right can be corrected by increasing lift of the canard wing on the right (e.g., canard wing 220a), which may correspond to a downward deflection of the right canard wing 220a relative to the planar surface 215. A roll bias to the right can also be corrected by decreasing lift of the canard wing on the left (e.g., canard wing 220b), which can correspond to an upward deflection of the left canard wing 220b relative to the planar surface 215. A roll bias to the left can be corrected by increasing lift of the canard wing on the left (e.g., canard wing 220b), which may correspond to a downward deflection of the left canard wing 220b relative to the planar surface 215. A roll bias to the left can also be corrected by decreasing lift of the canard wing on the right (e.g., canard wing 220a), which can correspond to an upward deflection of the right canard wing 220a relative to the planar surface 215.

In some aspects, the canard wings 220a, 220b can be used to correct roll bias in combination with the addition of one or more weights attached or coupled to the TVG towed apparatus 200. For instance, the planar surface 215 can include a plurality of coupling apertures 219 disposed at various locations along the planar surface 215. In some aspects, the coupling apertures 219 can be provided at locations that vary in distance from a central longitudinal axis of planar surface 215/TVG towed apparatus 200 (e.g., that vary in distance away from the tow point 212/electronics bottle 270, both of which can lie along the central longitudinal axis). A greater mass of a roll bias weight can correspond to a greater correction force exerted to counteract the roll bias. Similarly, a greater distance of the selected coupling aperture 219 from the central longitudinal axis of TVG towed apparatus 200 can also correspond to a greater correction force exerted to counteract the roll bias. For instance, a roll bias weight attached to the right-most coupling aperture 219 (e.g., closest to the longitudinal axis of right frame arm 230a) can exert a downward force on the right side of the TVG towed apparatus 200, which can be used to correct a roll bias to the left. A roll bias weight attached to the left-most coupling aperture 219 (e.g., closest to the longitudinal axis of left frame arm 230b) can exert a downward force on the left side of the TVG towed apparatus 200, which can be used to correct a roll bias to the right. One or more weights attached to a coupling aperture 219 that is along the central longitudinal axis of the TVG towed apparatus 200 (and/or weights attached at symmetrically offset coupling apertures 219) can be used to bias the of the TVG towed apparatus 200 in a downward (e.g., pitch down, dive down, etc.) direction, and may also be utilized in combination with a dive down configuration of the canard wings 220a, 220b and/or rear spar wing 250.

In some examples, the first canard wing 220a can be deflected upwards (e.g., relative to the plane of planar surface 215) to reduce the lift generated by first canard wing 220a. An upward deflection of first canard wing 220a can cause the TVG tow frame 200 to roll in the direction of the reduction in lift (e.g., can cause the TVG tow frame 200 to roll towards the right, which is the side where first canard wing 220a is located). Accordingly, first canard wing 220a can be deflected upwards relative to planar surface 215 to correct for a rolling motion of TVG tow frame 200 that is to the left.

Similar, a downward deflection of second canard wing 220b (e.g., relative to the plane of planar surface 215) can increase the lift generated by second canard wing 220b. A downward deflection of second canard wing 220b can cause the TVG tow frame to roll in the direction opposite of the increase in lift (e.g., can cause the TVG tow frame 200 to roll towards the right, which is the side opposite from second canard wing 220b). Accordingly, second canard wing 220b can be deflected downwards relative to planar surface 215 to correct for a rolling motion of TVG tow frame 200 that is to the left. In some combinations, split inputs to the pair of canard wings 220a, 220b can be used to control roll orientation of the TVG tow frame 200. For instance, continuing in the example above wherein the TVG tow frame 200 experiences an uncommanded or otherwise undesired roll to the left, a roll-correction can be implemented based on causing an upward deflection of first canard wing 220a and a downward deflection of second canard wing 220b (e.g., where both deflections are effective to cause the TVG tow frame 200 to roll to the right, and thereby roll out of the uncommanded roll to the left).

In one illustrative example, the canard wings 220a, 220b can both be independently adjustable between an upper and lower deflection range or limit. For instance, the canard wings 220a, 220b can be independently adjustable between a deflection range of +40 to −40 degrees, relative to the plane of planar surface 215, although it is noted that various other deflection ranges can also be utilized without departing from the scope of the present disclosure. In some aspects, the deflection range of +40 to −40 degrees can be used to enable both deep water (e.g., >20 m) and shallow water (e.g., <20 m) operations or deployments of the presently disclosed canard wing TVG frame 200. In some examples, the presently disclosed canard wing TVG frame 200 can be constructed using inherent safety Kevlar ropes to mitigate equipment and/or component loss. Mitigation of lost equipment can be desirable because lost equipment may be considered debris by governmental or regulatory bodies responsible for oversight of towed survey operations (e.g., for instance, lost equipment considered debris must, in at least some cases, be recovered by the survey operator). Furthermore, as will be described in greater depth below, the presently disclosed canard wing TVG frame (e.g., canard wing TVG frame 200) can be implemented in a modular fashion that is inexpensive to construct and easy to repair and/or re-configure in the field while deployed for TVG survey operations in either deep or shallow water environments.

In some examples, the pair of independently adjustable canard wings 220a, 220b may be used to command course adjustments by or for the TVG tow frame 200—whereas conventional TVG tow frames lack the ability to provide course adjustments for the TVG tow frame. In one illustrative example, the TVG tow frame(s) described herein can implement course adjustments (e.g., yaw control) based on one or more yaw control tabs, such as the yaw control tabs 1170a, 1170b depicted in the example of FIG. 11. For instance, the yaw control tabs can be provided as planar surfaces that are oriented perpendicularly to the planar surface 215 (and perpendicularly to the planar surfaces of the canard wings 220a, 220b when the canard wings are in a zero-deflection position and therefore coplanar with the planar surface 215).

Described below is an example of yaw control that may be implemented using the pair of independently adjustable canard wings, followed by an example of yaw control that may be implemented using the pair of yaw control tabs 1170a, 1170b of FIG. 11, noting again that the presently disclosed TVG towed apparatus(es) can implement yaw control and/or course correction based on canard wing adjustments, yaw control tab adjustments, or a combination of the two.

As noted previously, conventional TVG tow frames have a cross-track separation that is largely forced by uncontrollable environmental conditions (e.g., the cross water current condition). By contrast, the presently disclosed TVG tow frame 200 may, in some embodiments, use the independently pitch-adjustable canard wings 220a, 220b to implement a course adjustment to compensate for otherwise uncontrollable environmental conditions such as high cross water current conditions. Notably, the presently disclosed TVG tow frame can use the independently pitch-adjustable canard wings 220a, 220b to perform a course adjustment to maintain a cross track separation that is less than the 22 m BOEM limit 155 depicted in FIG. 1. For instance, in the example of FIG. 1, the TVG tow frame 200 of FIG. 2 can implement a course adjustment to move the TVG tow frame 200 to the left (e.g., closer to the vessel 110 and axis 105/to reduce the cross-track separation to the 14 m separation at position 170 of FIG. 1). In some aspects, the first canard wing 220a could be deflected downwards relative to the plane of planar surface 215 and/or second canard wing 220b could be deflected upwards relative to the plane of planar surface 215, with both deflections associated with causing the TVG tow frame 200 to roll to the left.

In one illustrative example, the first and second canard wings 220a, 220b can be configured to work in opposition in order to implement course adjustments and/or course corrections for the TVG tow frame 200. In particular, the first and second canard wings 220a, 220b can be configured to deflect in opposite directions such that the lift force acting on each respective side of the TVG tow frame 200 is unequal (e.g., the lift on first canard wing 220a and the lift on second canard wing 220b is unequal). Because the lift forces are not equal, the TVG tow frame 200 experiences a net twisting force about the center of gravity of the TVG tow frame 200, and the TVG tow frame 200 rotates (e.g., yaws) about its roll axis.

In one illustrative example, this roll-induced yaw motion is used to perform course adjustments for the TVG tow frame 200. For instance, again with reference to the example 150 of FIG. 1, where a course adjustment is needed to yaw the TVG tow frame 200 to the left (e.g., towards vessel 110 and axis 105, away from BOEM limit 155), the first canard wing 220a can be deflected downwards and the second canard wing 220b can be deflected upwards. The lift is greater on the first canard wing 220a than on the second canard wing 220b. Accordingly, the greater lift force acting on the first canard wing 220a causes the TVG tow frame 200 to yaw in the direction from the first canard wing 220*a* towards the central longitudinal axis of the TVG tow frame 200 (e.g., based on the central longitudinal axis of TVG tow frame 200 being approximately equal to the roll axis of the TVG tow frame 200).

In other words, increasing lift on first canard wing 220*a* above the amount of lift on second canard wing 220*b* (or equivalently, decreasing lift on second canard wing 220*b* below the amount of lift on first canard wing 220*a*) can be used to cause a yaw motion in a first direction—the counter-clockwise direction from the top-down perspective shown in FIG. 6. Similarly, increasing lift on second canard wing 220*b* above the amount of lift on first canard wing 220*a* (or equivalently, decreasing lift on first canard wing 220*a* below the amount of lift on second canard wing 220*b*) can be used to cause a yaw motion in a second direction—the clockwise direction from the top-down perspective shown in FIG. 6.

Figure 11:
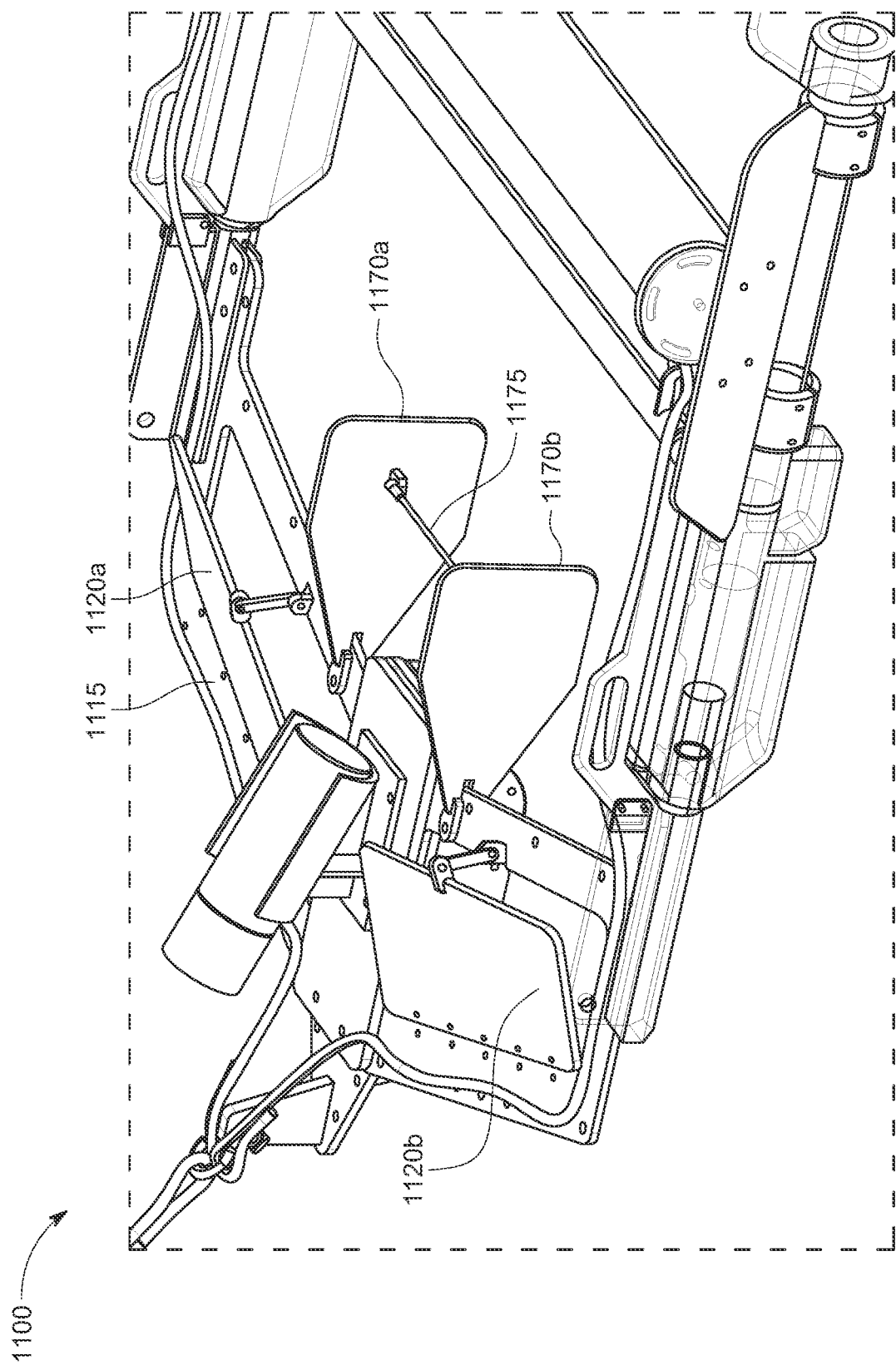
FIG. 11 is a perspective view of an example TVG towed apparatus with canard wings and two yaw control tabs, in accordance with some examples.

With reference now to the example TVG towed apparatus 1100 of FIG. 11 (which may be the same as or similar to the TVG towed apparatus 200 of FIG. 2 and/or the corresponding TVG towed apparatuses of any of FIGS. 3-9, with the addition of the pair of yaw control tabs 1170*a*, 1170*b* and yaw coupler 1175), in one illustrative example, yaw control can be provided based on the rotation or pivotable movement of the yaw control tabs 1170*a*, 1170*b*.

In some embodiments, the yaw control tabs 1170*a*, 1170*b* can be coupled to move in tandem, for instance via a yaw coupler 1175. The length of yaw coupler 1175 (and therefore, the separation between the yaw control tabs 1170*a*, 1170*b*) may be fixed or dynamic (e.g., adjustable). In one illustrative example, the yaw control tabs 1170*a*, 1170*b* can be adjusted (e.g., rotated or pivoted) about their respective attachment points to the planar surface 1115 of the TVG towed apparatus 1100. For instance, a corresponding first actuator can control the deflection of first yaw control tab 1170*a* and a corresponding second actuator can control the deflection of second yaw control tab 1170*b*. In some examples, the same one or more actuators can be used to control the deflection of both yaw control tabs 1170*a*, 1170*b* simultaneously. In examples where the yaw control tabs 1170*a*, 1170*b* are controlled separately, using separate actuators, the separate actuators can be used to implement the same deflection at both yaw control tabs 1170*a*, 1170*b* or may be used to implement different deflections at the yaw control tabs 1170*a*, 1170*b*. In some aspects, the actuators for deflecting the yaw control tabs 1170*a*, 1170*b* can be continuous and/or real-time actuators capable of achieving various deflections of the yaw control tabs 1170*a*, 1170*b*.

In some aspects, the deflection of the yaw control tabs 1170*a*, 1170*b* in a first direction (e.g., to the right of the TVG towed apparatus 1100/towards the right canard wing 1120*a*) can cause the TVG towed apparatus 1100 to move in a corresponding first yaw direction. For instance, deflection of the yaw control tabs 1170*a*, 1170*b* to the right can cause the TVG towed apparatus 1100 to yaw to the right. Deflection of the yaw control tabs 1170*a*, 1170*b* in a second direction (e.g., to the left of the TVG towed apparatus 1100/towards the left canard wing 1120*b*) can cause the TVG towed apparatus 1100 to move in a corresponding second yaw direction. For instance, deflection of the yaw control tabs 1170*a*, 1170*b* to the left can cause the TVG towed apparatus 1100 to the yaw to the left.

The yaw force exerted by the yaw control tabs 1170*a*, 1170*b* can be based on the deflection angle of each yaw control tab, where the deflection angle represents the angle formed between the plane of the yaw control tab in the deflected position and the plane of the yaw control tab in a perpendicular position relative to the planar surface 1115 (e.g., a zero-deflection or zero yaw command position). For instance, as the deflection angle of a yaw control tab 1170*a*, 1170*b* increases, the yaw force will increase. The yaw force exerted by the yaw control tabs 1170*a*, 1170*b* can additionally, or alternatively, be increased based on increasing the surface area of the planar surface of the yaw control tabs 1170*a*, 1170*b* (which may be provided as having the same shape and/or size, or may be provided using different shapes and/or sizes). In one illustrative example, the yaw control tabs 1170*a*, 1170*b* are identical to one another.

The yaw control tabs 1170*a*, 1170*b* may be provided at various locations along the TVG towed apparatus 1100. For instance, the yaw control tabs 1170*a*, 1170*b* can be symmetrically located about the central longitudinal axis of the TVG towed apparatus 1100. In some embodiments, the yaw control tabs 1170*a*, 1170*b* are located toward the front (e.g., nose) of the TVG towed apparatus 1100, to maximize the longitudinal separation distance between the yaw control tabs 1170*a*, 1170*b* and the magnetometers of the TVG.

Figure 7:
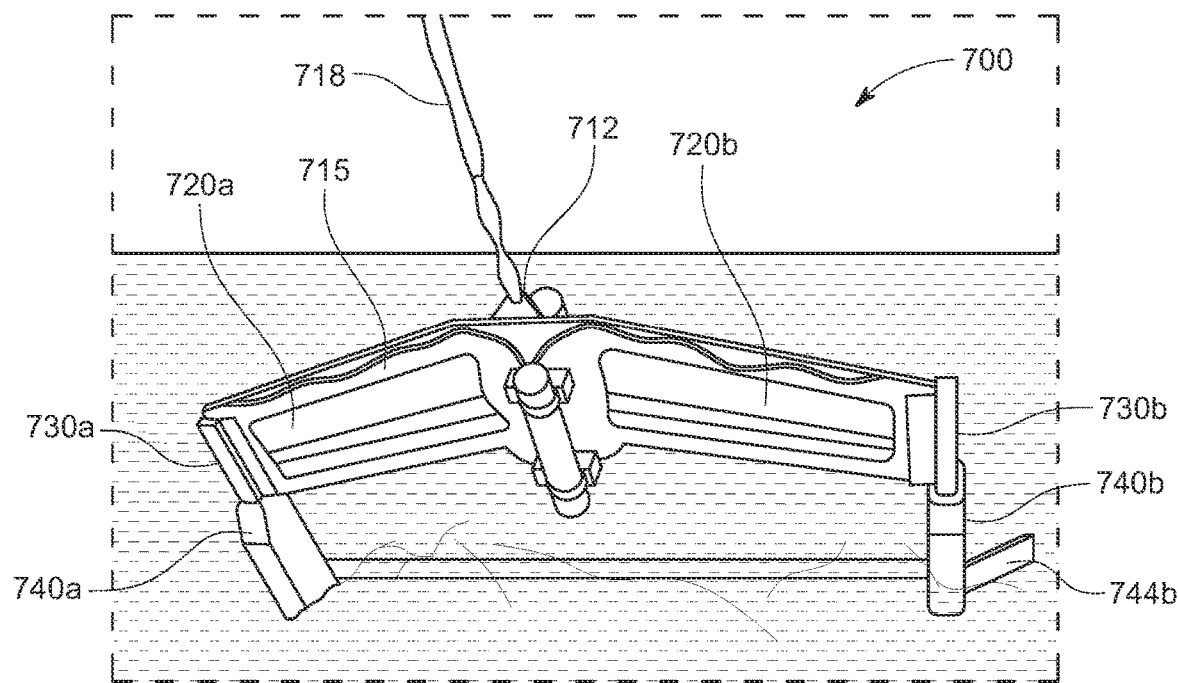
FIG. 7 is a perspective view illustrating an example TVG towed apparatus connected to a vessel with a tow cable, in accordance with some examples.
Figure 8:
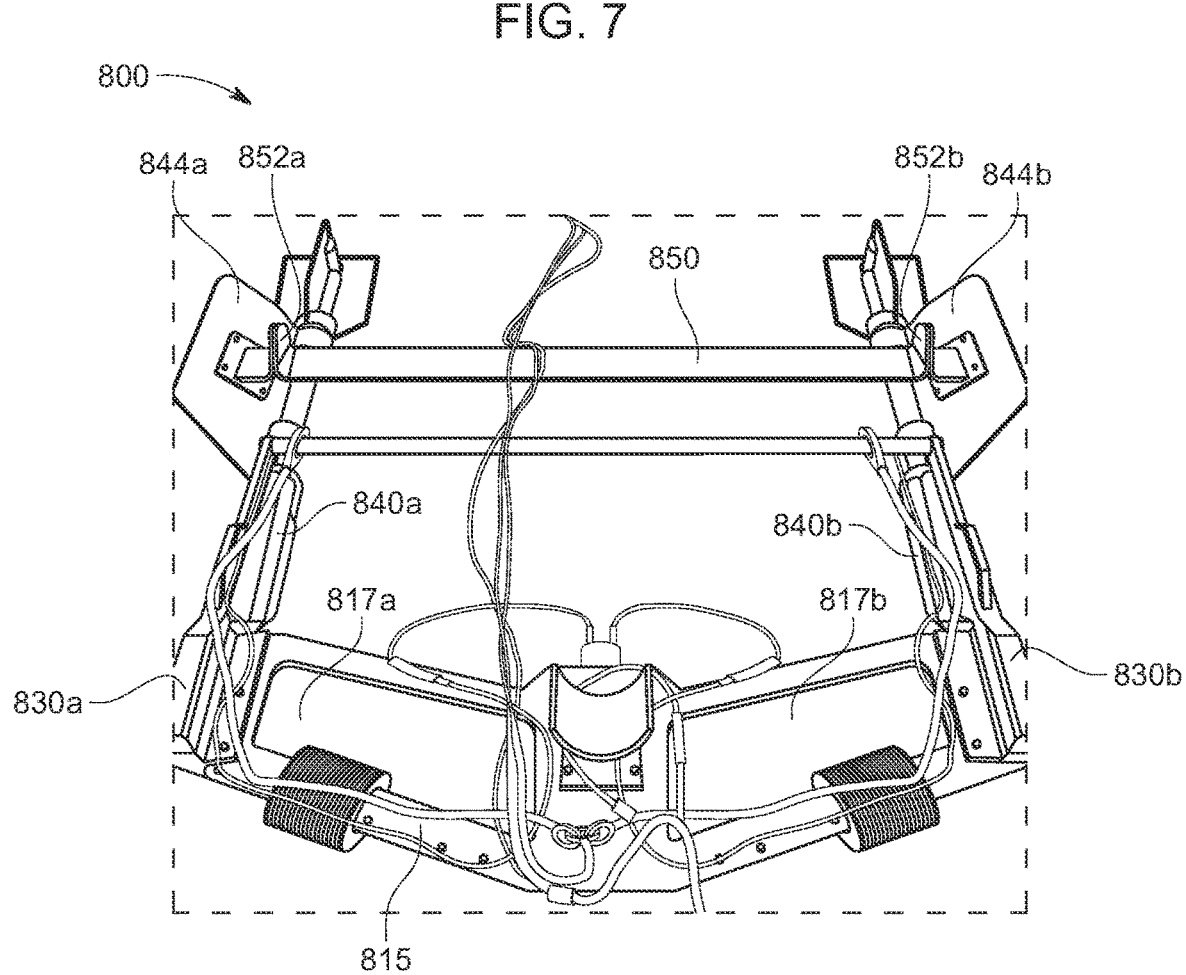
FIG. 8 is a top perspective view of an example TVG towed apparatus with canard wings removed, in accordance with some examples.

Returning now to the discussion of FIG. 2, in some embodiments the canard wings 220*a*, 220*b* can be rotatable about their respective leading edges 225*a*, 225*b*. For instance, the direction of travel of TVG tow frame 200 can be oriented approximately along the central longitudinal axis of the TVG tow frame 200, which can be aligned with a coupler 212 (e.g., a tow point 212). The of the TVG tow frame 200 can be towards the direction of travel and the rear of the TVG tow frame can be away from the direction of travel (e.g., based upon the TVG tow frame being coupled or tethered to a tow vessel via a rope/cable/tether attached to the tow point 212). Accordingly, when being towed via tow point 212, the leading edge 225*a* of first canard wing 220*a* is the edge closest to the tow point 212; the leading edge 225*b* of second canard wing 220*b* is the edge closest to the tow point 212 as well. In some embodiments, the canard wings 220*a*, 220*b* can rotate about their respective leading edges 225*a*, 225*b* using a hinge mechanism provided at the respective leading edges 225*a*, 225*b*, an example of which is depicted in FIGS. 7 and 8 and will be described in further detail therein.

In some aspects, the tow point 212 can be included in a tow module of the TVG tow frame 200. In one illustrative example, the tow point 212 can be positioned at a vertical distance above the planar surface 215. As noted previously, the planar surface 215 can also be referred to as a "frame wing." In some embodiments, the noise tow point 212 can additionally, or alternatively, be positioned with a vertical clearance that exceeds the vertical height of the trailing edges of the canard wings 220*a*, 220*b* when in their maximum upward deflected position.

In one illustrative example, the tow point 212 can be positioned with a vertical offset of at least 3 inches above the planar surface 215 (e.g., above the fame wing). The vertical offset (e.g., 3") of the tow point 212 can be used to assist the frame wing of planar surface 215 into flying level in the pitch axis and to mitigate kiting at higher survey speeds (e.g., survey speeds above approximately 4 knots).

In some aspects, the module design and material choice can both be used to move the center of gravity of the TVG tow frame 200 forward (e.g., closer to the tow point 212). For instance, the TVG tow frame 200 can be designed such that mass is concentrated in and/or around the planar surface 215. In some embodiments, the planar surface 215 (and/or one or more additional components of TVG tow frame 200) can be constructed from a stainless steel material or alloy, to further concentrate weight towards the nose, and thereby shift the center of gravity of TVG tow frame 200 towards the as well. The forward shift of the center of gravity of TVG tow frame 200 towards tow point 212 can additionally be seen to help the frame wing fly level in the pitch axis and mitigate kiting at relatively high survey speeds greater than approximately 4 knots.

In some examples, the module of TVG tow frame 200 can further include an electronics bottle 270 that comprises a sealed (e.g., waterproof) housing for various electronics components associated with the operation and/or control of TVG tow frame 200 and components thereof and/or associated with the operation, control, and/or sensing performed by the TVG magnetometers included in TVG tow frame 200, etc. The electronics bottle 270 can be positioned on or otherwise mounted to the planar surface 215, at a location that is approximately the same as the TVG tow frame 200 center of gravity, forward of the TVG tow frame 200 center of gravity, or slightly aft of the TVG tow frame 200 center of gravity. The electronics bottle 270 can be used to provide a first protection mechanism against impacts with the seabed, geohazards, the tow vessel (e.g., mother ship) stern, etc. The positioning of the electronics bottle 270 on the planar surface 215 can be seen to provide an additional protection mechanism to shelter the electronics components from impacts with the seabed, geohazards, the tow vessel stern, etc.

For instance, as noted above, planar surface 215 can be constructed from a relatively dense stainless steel material, while one or more additional components of the TVG tow frame 200 (e.g., the components located aft of the nose/aft of the center of gravity) can be constructed from relatively lightweight and/or low density materials. For example, the TVG tow frame 200 can include a first magnetometer electronics housing 240a and a second magnetometer electronics housing 240b, which can be associated with a first magnetometer housing 262a and a second magnetometer housing 262b, respectively. The magnetometer housings 262a, 262b can be provided at an aft distal end of the TVG towed apparatus 200, for example to reduce or minimize vibration of the magnetometers 265a and 265b that collectively comprise the transverse gradiometer (TVG) of the TVG towed apparatus 200. As illustrated, the magnetometer 265a is included in the magnetometer housing 262a and the magnetometer 265b is included in the magnetometer housing 262b. In some aspects, the magnetometer electronics housings 240a, 240b and the magnetometer housings 262a, 262b can be constructed from a relatively lightweight plastic material, and may be coaxial along the corresponding right or left frame arms 230a and 230b.

In some embodiments, the magnetometer electronics housings 240a, 240b, the magnetometer housings 262a, 262b, and the magnetometers 265a, 265b can each be included in a respective modular magnetometer towfish (also referred to as a "fish") that can be coupled to longitudinal rails or arms of the TVG frame 200 for quick and easy interchangeability with different or replacement magnetometers and/or magnetometer towfish. For instance, the TVG tow frame 200 can include a first frame arm 230a and a second frame arm 230b for a removable coupling or other attachment to a respective first and second magnetometer electronics housing 240a, 240b (which may themselves be included in a respective first and second magnetometer towfish). The magnetometer housing 262a and magnetometer 265a can be located aft of the magnetometer electronics housing 240a, substantially coaxial along the first frame arm 230a. The magnetometer housing 262b and magnetometer 265b can be located aft of the magnetometer electronics housing 240b, substantially coaxial along the second frame arm 230b. In some embodiments, the first and second magnetometer electronics housings 240a, 240b (and/or the respective magnetometer towfish thereof) can be constructed from relatively lightweight plastic or aluminum materials so as to minimize any center of gravity shift away from the stainless steel planar surface 215 of TVG tow frame 200.

Similarly, a lateral cross-brace or rear spar 290 used to rigidly affix or otherwise couple the first and second frame arms together (e.g., via rigid coupling of the rear spar 290 between the interior aft portions of the first and second magnetometer electronics housings 240a, 240b) can be provided from a rigid and lightweight material, such as carbon fiber, aluminum, etc. The rear spar 290 can be used to prevent, reduce, or minimize twisting movements of the two longitudinal arms of the TVG tow frame 200 (e.g., the two longitudinal arms extending from the first and second frame arms 230a, 230b).

Behind the rear spar 290, a pitch-adjustable rear spar wing 250 can be coupled between a first dihedral fin 244a and a second dihedral fin 244b. In some aspects, the first and second dihedral fins 244a, 244b can be included in respective first and second magnetometer towfish corresponding to the first and second magnetometer electronics housings 240a, 240b, respectively. In other examples, the first and second dihedral fins 244a, 244b can be components of the TVG tow frame 200 and/or frame arms 230a, 230b, respectively, rather than the modular and removably attachable first and second magnetometer towfish.

The first and second dihedral fins 244a, 244b can form respective first and second dihedral angles relative to the horizontal plane that includes (e.g., is coplanar with) the planar surface 215. In other words, the first and second dihedral fins 244a, 244b can form respective first and second dihedral angles given as the upward angle from the horizontal of the frame wing/planar surface 215. In some embodiments, the first and second dihedral angles are the same. The first and second dihedral angles can be selected based on desired roll properties of the TVG frame 200 (e.g., based on the dihedral effect associated with the first and second dihedral fins 244a, 244b and the respective first and second dihedral angles thereof).

The pitch-adjustable rear spar wing 250 can be coupled between the first and second dihedral fins 244a, 244b using respective first and second rotatable couplers 252a, 252b. For instance, the first rotatable coupler 252a can be rigidly affixed to the interior-facing surface of first dihedral fin 244a and rotatably coupled to a first distal end of pitch-adjustable rear spar wing 250; the second rotatable coupler 252b can be rigidly affixed to the interior-facing surface of second dihedral fin 244b and rotatable coupled to a second distal end of pitch-adjustable rear spar wing 250.

In one illustrative example, the rear spar wing 250 can be pitch-adjustable via rotation about a rotation axis that is parallel to and/or the same as the longitudinal axis of the rear spar wing 250 itself (e.g., the axis running from between the first and second rotatable couplers 252a, 252b mounting the rear spar wing 250 to the first and second dihedral fins 244a, 244b, respectively). In some embodiments, the rear spar wing 250 is pitch-adjustable via rotation of the rotatable couplers 252a, 252b to aid in stable flight of the TVG tow frame 200.

The rear spar wing 250 can be configured to work in concert with the pair of independently pitch-adjustable front canard wings 220a, 220b. The front canard wings 220a, 220b can be independently pitch-adjustable relative to one another (e.g., as described previously) and can additionally be pitch-adjustable relative to the rear spar wing 250.

In one illustrative example, increasing the pitch of the rear spar wing 250 comprises increasing the deflection angle of rear spar wing 250 relative to the horizontal plane of planar surface 215. For instance, the pitch of the rear spar wing 250 can be determined as the angle between the plane of planar surface 215 and the line extending from the trailing edge of rear spar wing 250 to the leading edge of rear spar wing 250—where the leading edge of rear spar wing 250 is the edge closest towards the of TVG frame 200 (e.g., the left-hand edge in the view of FIG. 2), and the trailing edge of rear spar wing 250 is the edge that is farthest (e.g., away) from the of TVG frame 200 (e.g., the right-hand edge in the view of FIG. 2).

As depicted in FIG. 2, the rear spar wing 250 is shown in positive pitch angle configuration, where the leading edge of rear spar wing 250 is vertically above the trailing edge of rear spar wing 250. In a positive pitch angle configuration, the rear spar wing 250 generates or experiences an increased lift force, approximately proportional to the positive pitch angle of the rear spar wing 250. Similarly, in a negative pitch angle configuration, the leading edge of rear spar wing 250 is vertically below the trailing edge of rear spar wing 250, and the rear spar wing 250 generates or experiences a decreased lift force and/or a downward (negative) lift force). In some aspects, a lift force generated by the rear spar wing 250 may be less than the lift force generated by the canard wings 220a, 220b.

The rear spar wing 250 may be located aft of the center of gravity and center of lift of TVG tow frame 200. Accordingly, a positive pitch angle (and upward lift force) corresponding to rear spar wing 250 can cause the TVG tow frame 200 to pitch down, all else equal. A negative pitch angle (and downward lift force) corresponding to rear spar wing 250 can cause the TVG tow frame 200 to pitch upwards, all else equal.

In some embodiments, the TVG tow frame 200 can be associated with a lift force generated by the fixed frame wing comprising the planar surface 200, and adjustable lift force, a variable lift force associated with each of the first and second canard wings 220a, 220b, and a variable lift force associated with the rear spar wing 250.

In one illustrative example, the TVG tow frame 200 can be configured according to a deep water configuration (e.g., corresponding to deployments with a water depth of approximately 20 m or greater) or according to a shallow water configuration (e.g., corresponding to deployments with a water depth of approximately 20 m or less).

In the deep water configuration of TVG tow frame 200, the layback ratio of the TVG tow frame 200 can advantageously be reduced from the 1:6 layback ratio associated with conventional TVG tow frames (e.g., as described with respect to FIG. 1) to approximately a 1:2.5 layback ratio. Reducing the layback ratio of TVG tow frame 200 can be used to reduce the cross-track separation between the TVG tow frame 200 and the tow vessel and/or the axis of an intended survey line (e.g., axis 105 of FIG. 1). In particular, the deep water configuration of TVG tow frame 200 can be referred to as a "dive down" or "pitch down" configuration of the TVG tow frame 200. In some cases, the reduction in layback ratio (independent of deep or shallow water configuration of the TVG tow frame 200) can be further implemented based on the unique combination of no tow bridle and the shape of the front tow wing provided by the planar surface 215 (e.g., the frame wing).

For example, FIG. 2 depicts the TVG tow frame 200 in the deep water, dive down configuration. The canard wings 220a, 220b can be pitch-adjusted to exert a downward force on the TVG tow frame 200 to cause a diving movement and reduction of the layback ratio. For instance, the canard wings 220a, 220b can be deflected upwards from the planar surface/frame wing 215, resulting in a net (or effective/perceived) downward lift force on the of the TVG tow frame 200 as compared to the lift force on the of the TVG tow frame 200 when the canard wings 220a, 220b are in a 0-pitch deflection position. In the deep water, dive down configuration, the rear spar wing 250 can be pitch-adjusted to exert an upward force on the aft portion of the TVG tow frame 200, to thereby cause a diving movement and reduction of the layback ratio as well. For instance, the rear spar wing 250 can be rotated into a positive pitch angle, resulting in a net (or effective/perceived) downward force driving the of the TVG tow frame 200 in a downward diving direction as well.

In one illustrative example, the short layback ratio achieved by the deep water/dive down configuration of TVG tow frame 200 can be used to mitigate data gaps associated with the TVG surveying performed using the TVG/pair of magnetometers 265a, 265b included in the TVG tow frame 200. In many examples, the short layback ratio and associated mitigation of data gaps can be seen to reduce the marine survey work required for a TVG survey by at least 15%.

In the shallow water configuration, the same TVG tow frame 200 can be used at water depths of 20 m or less. For example, in the "dive up" shallow water configuration, the same TVG tow frame 200 can be configured with the canard wings 220a, 220b in a downward (e.g., negative deflection) position relative to the planar surface/frame wing/front tow wing 215, to thereby exert an upward lift force on the of the TVG tow frame 200. For instance, FIG. 3 is a perspective view of an example TVG towed apparatus 300, with first and second canard wings 320a, 320b in a shallow water configuration corresponding to a negative deflection angle below the planar surface 315.

Figure 3:
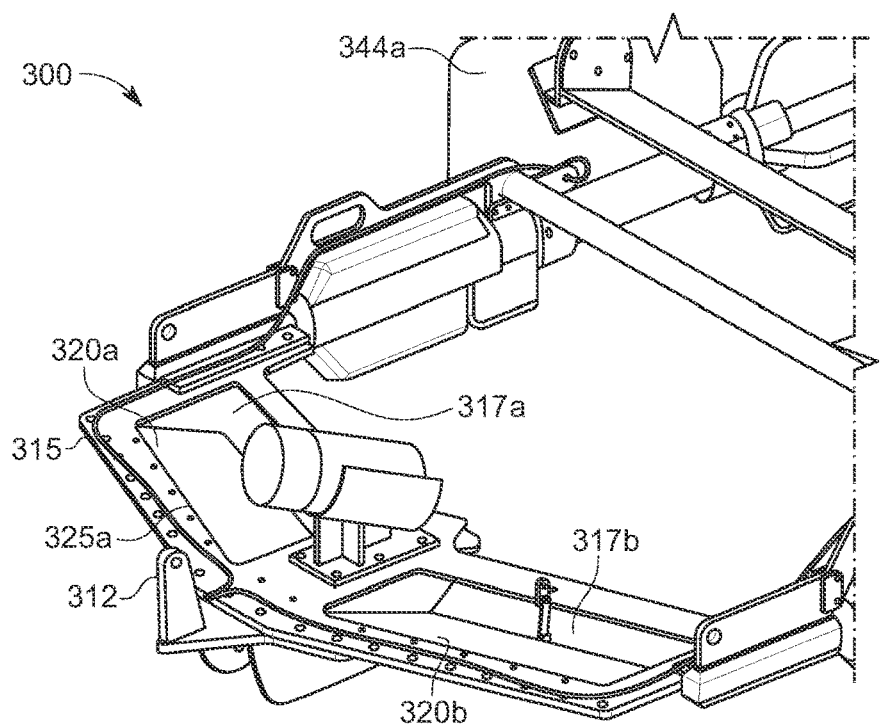
FIG. 3 is a perspective view of an example TVG towed apparatus with canard wings rotated to a second pitch adjustment position associated with a second pitch adjustment direction, in accordance with some examples.

In some aspects, the TVG towed apparatus 300 (e.g., TVG tow frame 300) can be the same as or similar to the TVG tow frame 200 of FIG. 2; the canard wings 320a, 320b of FIG. 3 can be the same as or similar to the canard wings 220a, 220b of FIG. 2; the planar surface 315 of FIG. 3 can be the same as or similar to the planar surface 215 of FIG. 2; etc.

As depicted in FIG. 3, each canard wing 320a, 320b can correspond to a respective aperture or opening 317a, 317b provided through the planar surface 315. In a 0-pitch deflection configuration, the canard wings 320a, 320b can be received in the respective apertures 317a, 317b such that the canard wings 320a, 320b are substantially flush and/or coplanar with the planar surface 315. Each canard wing 320a, 320b can rotate about its respective leading edge, such as the leading edge 325a of first canard wing 320a shown in FIG. 3 (e.g., which can be the same as or similar to the leading edge 225a of first canard wing 220a in FIG. 2). The tow point 312 of FIG. 3 can be the same as or similar to the tow point 212 of FIG. 2.

In the shallow water configuration, the rear spar wing (e.g., rear spar wing 250 of FIG. 2 and/or rear spar wing 350 of FIG. 3, which may be the same as or similar to one another) may additionally be rotated to a flat or negative pitch angle to further cause the upward movement of the TVG tow frame 200. For instance, a negative pitch angle of rear spar wing 250/350 results in a reduced upward lift force or a newly caused downward lift force at rear spar wing 250/350, which is aft of the TVG tow frame 200/300 center of gravity and/or center of lift, thereby causing the force at rear spar wing 250/350 to lift the of the TVG tow frame 200/300. As shown in FIG. 3, the rear spar wing 350 is in an approximately flat pitch angle, causing the TVG tow frame 300 to move upwards based on the upward lift force at the front canard wings 320a, 320b (e.g., the contribution from rear spar wing 350 may be negligible or approximately neutral in the approximately flat pitch angle configuration shown in FIG. 3).

In the shallow water, dive up configuration, the TVG tow frame 200/300 can be configured to dive upwards to increase the cable out length between the tow vessel and TVG tow frame 200/300. In particular, the increased cable out length can be seen to increase the layback away from the magnetic signature of the mother tow vessel, thereby improving the accuracy and/or quality of TVG magnetometer readings collected by the TVG tow frame 200/300. In some aspects, the shallow water dive up configuration can be utilized to achieve a layback of at least three times the length of the mother tow vessel's length.

FIG. 4 is a side perspective view of an example TVG towed apparatus 400. In one illustrative example, the example TVG towed apparatus 400 of FIG. 4 can be the same as the example TVG towed apparatus 300 of FIG. 3. For instance, the side perspective view of FIG. 4 shows the TVG towed apparatus 400 (e.g., TVG towed apparatus 300) with canard wings 320a, 320b rotated to another pitch adjustment position in the opposite pitch adjustment direction than those of the configuration shown in FIG. 3. For instance, FIG. 3 depicts a dive up configuration of TVG tow frame 300, where the canard wings 320a, 320b are deflected downward relative to the planar surface 315. FIG. 4 depicts a dive down configuration of TVG tow frame 400 (e.g., TVG tow frame 300), where the canard wings 320a, 320b are deflected upward relative to the planar surface 315.

Figure 5:
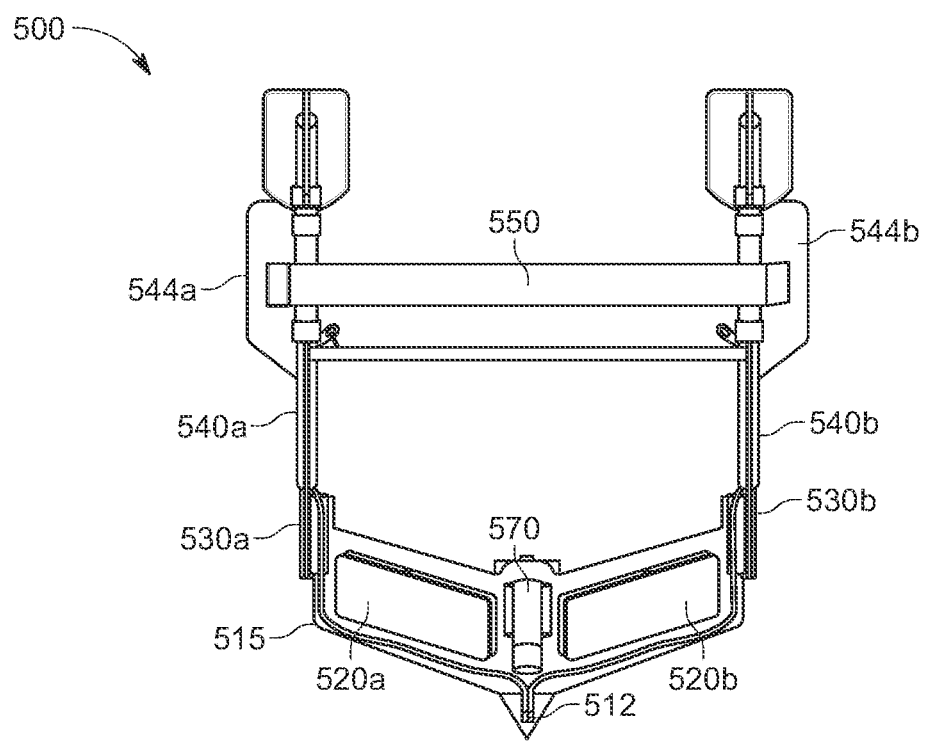
FIG. 5 is a top view of an example TVG towed apparatus with canard wings, in accordance with some examples.

FIG. 5 is a top view of an example TVG towed apparatus 500 with canard wings, in accordance with some examples. FIG. 6 is a side view 600 of the example TVG towed apparatus 500 shown in FIG. 5. In one illustrative example, the TVG towed apparatus 500 (e.g., TVG tow frame 500) can be the same as or similar to one or more (or all) of the TVG tow frame 200 of FIG. 2, the TVG tow frame 300 of FIG. 3, the TVG tow frame 400 of FIG. 4, and/or various other TVG tow frames described herein.

Figure 6:
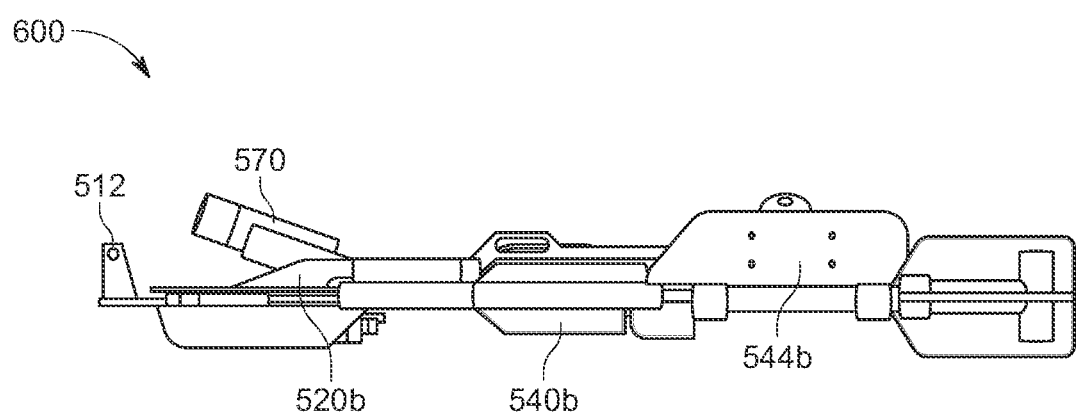
FIG. 6 is a side view of the example TVG towed apparatus with canard wings of FIG. 5, in accordance with some examples.

As shown, the TVG tow frame 500 includes first and second canard wings 520a, 520b and a planar surface 515, which may be the same as or similar to the corresponding components in FIGS. 2-4 and/or in any other embodiments described herein and/or depicted in FIGS. 2-10. The tow point 512, sensor bottle 570, first and second frame arms 530a, 530b (respectively), first and second magnetometer electronics housings 540a, 540b (respectively), first and second dihedral fins 544a, 544b (respectively), and rear spar wing 550 may each be the same as or similar to the corresponding components in FIGS. 2-4 and/or in any other embodiments described herein and/or depicted in FIGS. 2-10. In some aspects, the first and second magnetometers (e.g., the same as or similar to the magnetometers 265a, 265b of FIG. 2) can be installed into TVG tow frame 500 with 1.5 cross track separation between the first and second frame arms 530a, 530b (respectively). As shown in FIG. 6, in some embodiments, the tow point 512 and/or sensor bottle 570 can be positioned with corresponding vertical offsets above the plane of planar surface 515.

FIG. 7 is a perspective view illustrating an example TVG towed apparatus (e.g., TVG tow frame) 700 connected to a vessel with a tow cable 718, in accordance with some examples. For instance, FIG. 7 is depicted from the stern (e.g., aft portion) of a tow vessel used to tow and deploy the TVG tow frame 700. The cable (tether) 718 is coupled between the mother vessel and the tow point 712 of TVG tow frame 700. The tow point 712 may be the same as or similar to one or more (or all) of the tow points 212, 312, 512 of FIGS. 2-6 . . . . In one illustrative example, the TVG tow frame 700 depicted in FIG. 7 can be the same as or similar to one or more (or all) of the TVG tow frame 200 of FIG. 2, the TVG tow frame 300 of FIGS. 3-4, the TVG tow frame 500 of FIGS. 5-6, etc.

As shown in FIG. 7, first and second canard wings 720a, 720b, respectively, are in a small pitch-up deflection relative to the plane of planar surface 715. The canard wings 720a, 720b are associated with respective apertured in or through the surface of planar surface 715, which is itself coupled between first and second frame arms 730a, 730b. First and second magnetometer electronics housings 740a, 740b are coupled to the respective first and second frame arms 730a, 730b. Each magnetometer electronics housing can be forward of a corresponding dihedral fin, such as the second dihedral fin 744b that is coaxial with the second magnetometer electronics housing 740b.

In some aspects, the TVG tow frame 700 and its respective components shown in FIG. 7 (e.g., tow point 712, planar surface 715, first canard wing 720a, second canard wing 720b, first and second frame arms 730a, 730b (respectively), first and second dihedral fins 740a, 740b (respectively), second dihedral fin 744b, etc.) may each be the same as or similar to the corresponding components in FIGS. 2-6 and/or in any other embodiments described herein and/or depicted in FIGS. 2-10.

FIG. 8 is a top perspective view of an example TVG towed apparatus (e.g., TVG tow frame) 800 with canard wings removed, in accordance with some examples. In one illustrative example, the TVG tow frame 800 depicted in FIG. 8 can be the same as or similar to one or more (or all) of the TVG tow frame 200 of FIG. 2, the TVG tow frame 300 of FIGS. 3-4, the TVG tow frame 500 of FIGS. 5-6, the TVG tow frame 700 of FIG. 7, etc. In some aspects, the TVG tow frame 800 and its respective components shown in FIG. 8 (e.g., planar surface 815, first canard wing aperture 817a, second canard wing aperture 817b, first frame arm 830a, second frame arm 830b, first magnetometer electronics housing 840a, second magnetometer electronics housing 840b, rear spar wing 850, first dihedral fin 844a, second dihedral fin 844b, first rotatable coupler 852a, second rotatable coupler 852b, etc.) may each be the same as or similar to the corresponding components in FIGS. 2-7 and/or in any other embodiments described herein and/or depicted in FIGS. 2-10.

Figure 9:
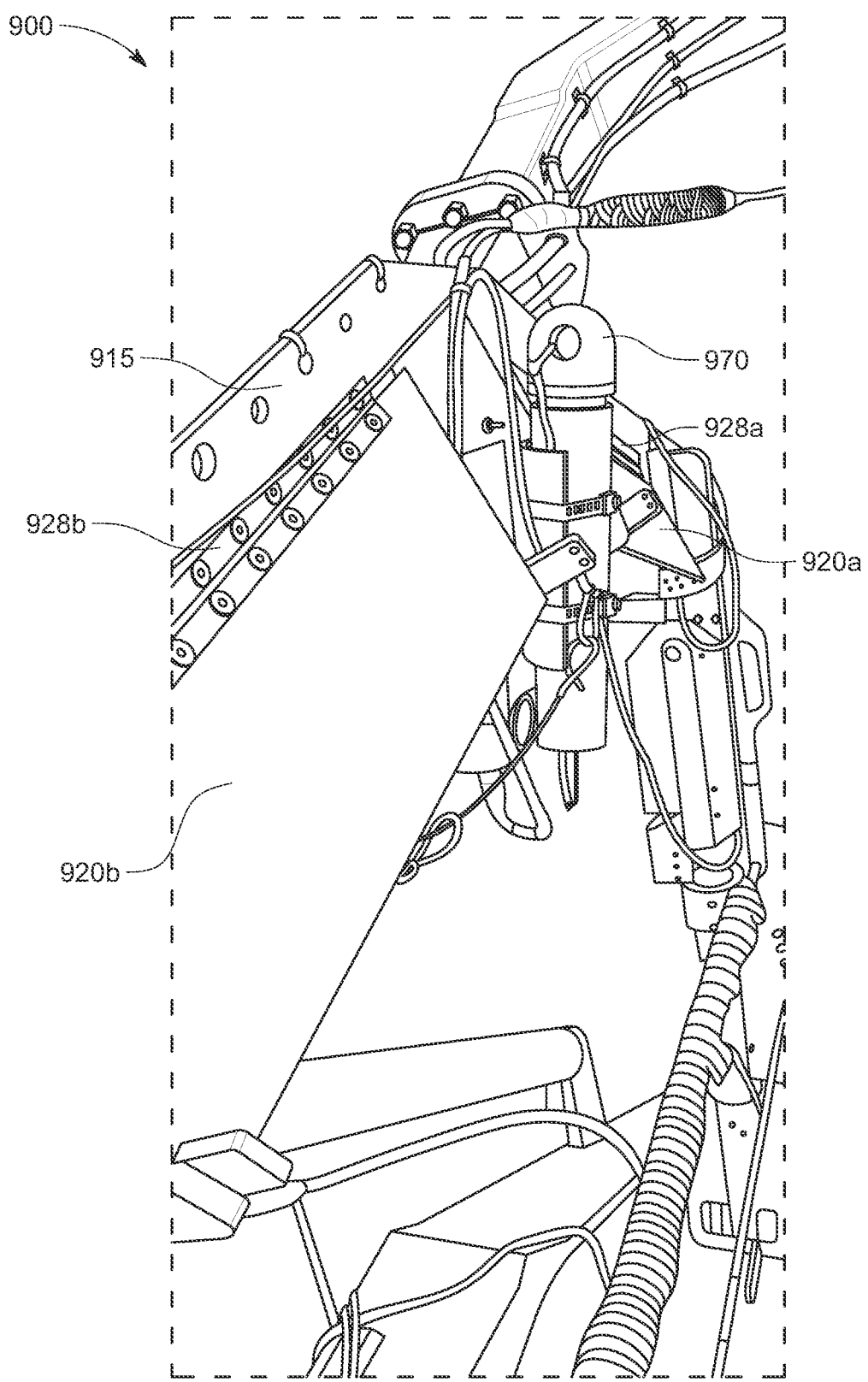
FIG. 9 is a side perspective view of a front portion of an example TVG towed apparatus with canard wings, in accordance with some examples.

FIG. 9 is a side perspective view of a front portion of an example TVG towed apparatus (e.g., tow frame) 900 with canard wings, in accordance with some examples. In one illustrative example, the TVG tow frame 900 depicted in FIG. 9 can be the same as or similar to one or more (or all) of the TVG tow frame 200 of FIG. 2, the TVG tow frame 300 of FIGS. 3-4, the TVG tow frame 500 of FIGS. 5-6, the TVG tow frame 700 of FIG. 7, the TVG tow frame 800 of FIG. 8, etc. In particular, FIG. 9 can correspond to a recovery and/or deployment operation of TVG tow frame 900 to or from (respectively) a mother tow vessel, without requiring manual recovery as is the case with existing and conventional TVG tow frames. As noted previously, the presently disclosed canard wing TVG tow frame in some embodiments does not include a tow bridle or a Y-tow arm, because the inclusion of a tow bridle or a Y-tow arm can otherwise impede recovery and deployment of the tow frame on vessels with an average height A-frame. Accordingly, the presently disclosed canard wing TVG tow frame can be safer than a TVG tow frame that includes a tow bridle or Y-tow arm, both of which would require the unit to be pulled onboard the tow vessel by hand. For instance, a tow point (not visible in FIG. 9) can be used to perform deployment and/or recovery operations for TVG tow frame 900 without requiring crew members to manually pull the unit onboard the tow vessel by hand.

In some aspects, the TVG tow frame 900 and its respective components shown in FIG. 9 (e.g., planar surface 915, first canard wing 920a, second canard wing 920b, sensor bottle 970, etc.) may each be the same as or similar to the corresponding components in FIGS. 2-8 and/or in any other embodiments described herein and/or depicted in FIGS. 2-10.

Also shown in FIG. 9 are respective first and second hinges 928a, 928b corresponding to the respective first and second canard wings 920a, 920b. In one illustrative example, the hinges 928a, 928b are coupled between the leading edge of the canard wings 920a, 920b (respectively) and the planar surface 915 of the TVG tow frame 900. The hinges 928a, 928b can be used to provide the deflection of the canard wings 920a, 920b in a positive or negative deflection angle relative to the planar surface 915 (e.g., for the deflection range of +40 to −40 degrees, in some examples). As shown in FIG. 9, the first and second canard wings 920a, 920b are configured in an upward deflection (e.g., positive deflection angle) relative to the planar surface 915, with the deflection implemented using the corresponding first and second hinges 928a, 928b.

Figure 10:
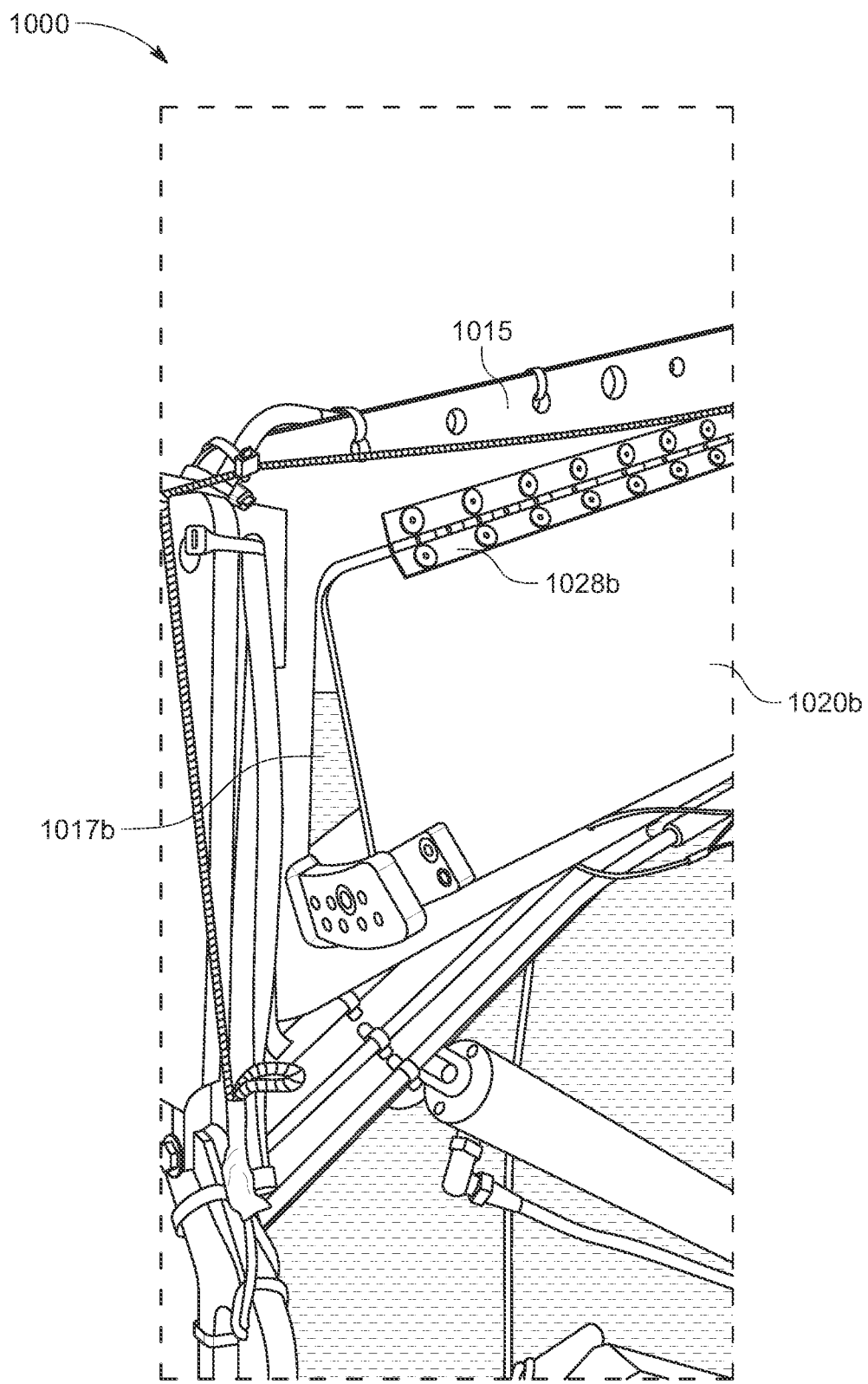
FIG. 10 is another side perspective view of a front portion of an example TVG towed apparatus with canard wings, in accordance with some examples.

FIG. 10 is another side perspective view of a front portion of an example TVG towed apparatus (e.g., tow frame) 1000 with canard wings, in accordance with some examples. In one illustrative example, the TVG tow frame 1000 depicted in FIG. 10 can be the same as or similar to one or more (or all) of the TVG tow frame 200 of FIG. 2, the TVG tow frame 300 of FIGS. 3-4, the TVG tow frame 500 of FIGS. 5-6, the TVG tow frame 700 of FIG. 7, the TVG tow frame 800 of FIG. 8, the TVG tow frame 900 of FIG. 9, etc. In some aspects, the TVG tow frame 1000 and its respective components shown in FIG. 10 (e.g., planar surface 1015, second hinge 1028b, second aperture 1017b, second canard wing 1020b, etc.) may each be the same as or similar to the corresponding components in FIGS. 2-11 and/or in any other embodiments described herein and/or depicted in FIGS. 2-11.

Figure 12:
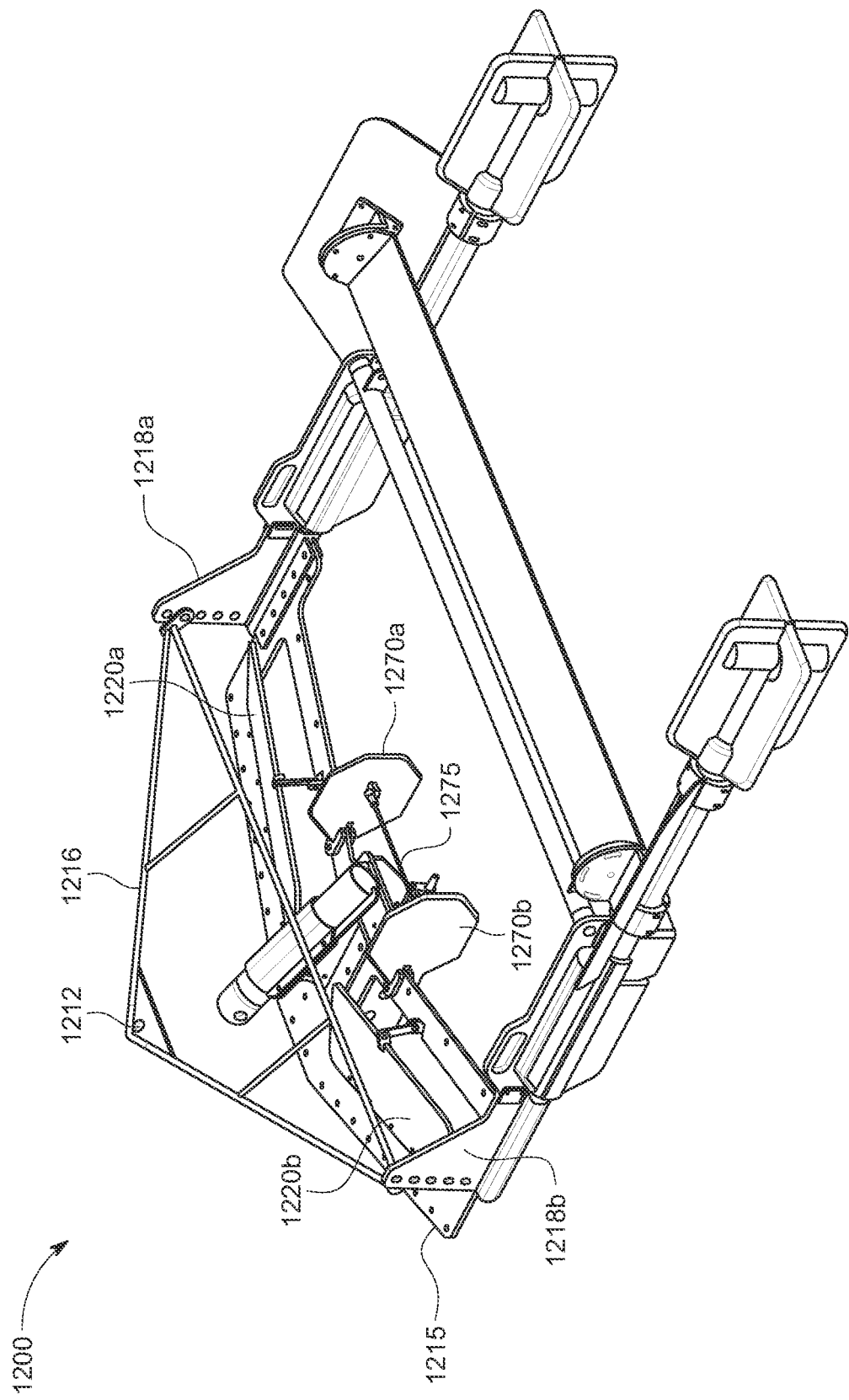
FIG. 12 is a first perspective view of an example TVG towed apparatus with a pivot bar tow point vertically offset from a planar surface, in accordance with some examples.

FIG. 12 is a first perspective view of an example TVG towed apparatus (e.g., tow frame) 1200 with a pivot bar tow point that is vertically offset from a planar surface, in accordance with some examples. In one illustrative example, the TVG tow frame 1200 depicted in FIG. 12 can be the same as or similar to one or more (or all) of the TVG tow frame 200 of FIG. 2, the TVG tow frame 300 of FIGS. 3-4, the TVG tow frame 500 of FIGS. 5-6, the TVG tow frame 700 of FIG. 7, the TVG tow frame 800 of FIG. 8, the TVG tow frame 900 of FIG. 9, the TVG tow frame 1000 of FIG. 10, the TVG tow frame 1100 of FIG. 11, etc. In some aspects, the TVG tow frame 1200 and its respective components shown in FIG. 12 (e.g., planar surface 1215, first canard wing 1220a, second canard wing 1220b, etc.) can each be the same as or similar to the corresponding components in FIGS. 2-11 and/or in any other embodiments described herein and/or depicted in FIGS. 2-11.

As illustrated, the TVG towed apparatus 1200 further includes a first and second yaw control tab 1270a, 1270b which can be used to perform course correction and/or heading adjustments of the TVG towed apparatus 1200. For instance, the first and second yaw control tabs 1270a, 1270b can be the same as or similar to the respective first and second yaw control tabs 1170a, 1170b of FIG. 11, and may be used in a same or similar manner to perform course correction and/or heading adjustments of the TVG towed apparatus 1200. In some embodiments, the first and second yaw control tabs 1270a, 1270b can be coupled to move in tandem, for instance via a yaw coupler 1275. In some aspects, the yaw coupler 1275 of FIG. 12 can be the same as or similar to the yaw coupler 1175 of FIG. 11. The length of yaw coupler 1275 (and therefore, the separation between the yaw control tabs 1270a, 1270b) may be fixed or dynamic (e.g., adjustable).

In one illustrative example, the TVG towed apparatus 1200 includes an adjustable pivot bar 1216 that includes a tow point aperture 1212 for coupling the TVG towed apparatus 1200 to a surface tow vessel (e.g., mother ship, survey vessel, etc.). For instance, a tow cable or tether can be passed through the tow point aperture 1212 (or otherwise coupled or secure to the tow point aperture 1212) in order to secure the TVG towed apparatus 1200 to the surface tow vessel for performing a towed survey operation.

In some embodiments, the adjustable pivot bar 1216 can be rotatably coupled between a first pivot support element 1218a and a second pivot support element 1218b. In some aspects, the pivot support elements 1218a, 1218b can be attached to the planar surface 1215. In some embodiments, the pivot support elements 1218a, 1218b can be detachably coupled to the planar surface 1215. In other examples, the pivot support elements 1218a, 1218b may be integrally formed with the planar surface 1215.

As illustrated, the pivot support elements 1218a, 1218b may be disposed along the respective longitudinal arms of the TVG tow frame 1200, and may be oriented to be generally perpendicular to the planar surface 1215. In some examples, the pivot support elements 1218a, 1218b can include one or more coupling points for attaching the adjustable pivot bar 1216 at different heights (e.g., different vertical offsets) above the planar surface 1215. For instance, as shown in FIG. 12, each pivot support element 1218a, 1218b can include a plurality of receiving apertures oriented along a line that is coplanar with the respective pivot support element 1218a or 1218b and perpendicular to the planar surface 1215. By rotatably coupling a first distal end of the adjustable pivot bar 1216 to a selected receiving aperture of the first pivot support element 1218a, and rotatably coupling a second distal end of the adjustable pivot bar 1216 to a corresponding receiving aperture of the second pivot support element 1218b (e.g., such that the distal ends of adjustable pivot bar 1216 are disposed at the same vertical offset above the planar surface 1215), the adjustable pivot bar 1216 can rotate about an axis of rotation extending through the two selected receiving apertures of the first and second pivot support elements 1218a, 1218b.

In some embodiments, the adjustable pivot bar 1216 can be used to position the tow point aperture 1212 above the canard wings 1220a, 1220b. For instance, the tow point aperture 1212 can be located at a greater vertical offset from the planar surface 1215 than the tow point aperture 212 of FIG. 2 is located relative to the planar surface 215 of FIG. 2. In some aspects, the adjustable pivot bar 1216 can be used to position the tow point aperture 1212 directly above (or slight aft/behind) the canard wings 1220a, 1220b, noting that the horizontal position of the tow point aperture 1212 shifts aft as the adjustable pivot bar 1216 is rotated to increase the vertical offset of the tow point aperture 1212 from the planar surface 1215.

In some cases, the adjustable pivot bar 1216 can be associate with a reduced weight relative to the assembly including the tow point 212 of FIG. 2. In some examples, the adjustable pivot bar 1216 can additionally be seen to increase the structural integrity of the TVG towed apparatus 1200. For instance, the adjustable pivot bar 1216 coupled between the pivot support elements 1218a, 1218b can provide an additional cross-beam (e.g., spar) between the right and left longitudinal frame arms of the TVG towed apparatus 1200, increasing the rigidity of the TVG towed apparatus 1200 and increasing resistance to twisting forces on the right and left longitudinal arms. In some embodiments, the adjustable pivot bar 1216 can be used to position the tow point aperture 1212 20% further aft than the tow point 212 shown in FIG. 2. In some examples, this shift of the tow point aperture 1212 can be seen to improve the responsiveness of the canard wings 1220a, 1220b.

Figure 13:
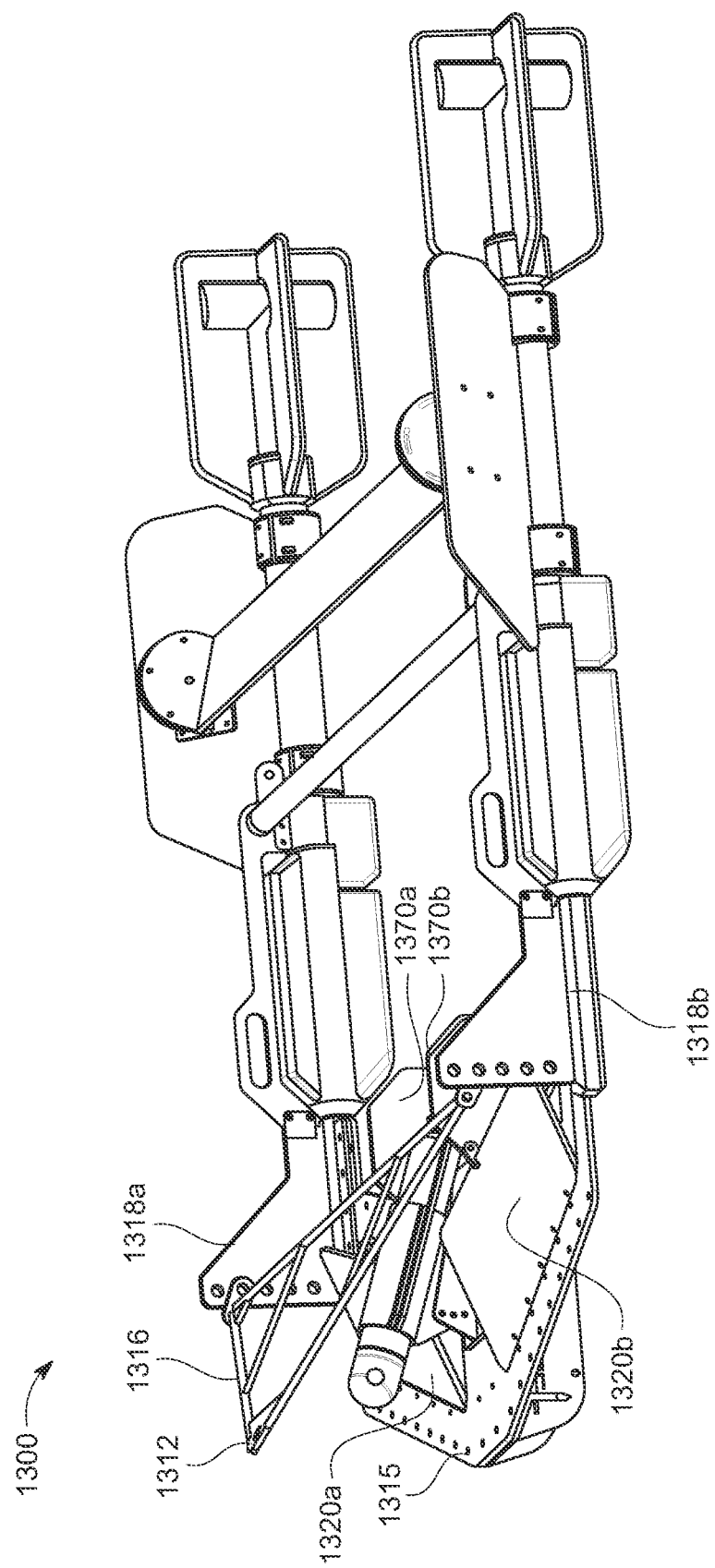
FIG. 13 is a second perspective view of the example TVG towed apparatus of FIG. 12.

FIG. 13 is a second perspective view of an example TVG towed apparatus (e.g., tow frame) 1300 with a pivot bar tow point that is vertically offset from a planar surface, in accordance with some examples. For instance, the TVG towed apparatus 1300 of FIG. 13 can be the same as the TVG towed apparatus 1200 of FIG. 12. In some aspects, the canard wing 13320a of FIG. 13 can be the same as the canard wing 1220a of FIG. 12, the canard wing 1320b can be the same as the canard wing 1220b of FIG. 12, the planar surface 1315 can be the same as the planar surface 1215 of FIG. 12, etc. The yaw control tabs 1370a, 1370b can be the same as or similar to the yaw control tabs 1170a, 1170b of FIG. 11 and/or the yaw control tabs 1270a, 1270b of FIG. 12, respectively.

In one illustrative example, the pivot support elements 1318a, 1318b can be the same as or similar to the pivot support elements 1218a, 1218b of FIG. 12. For instance, the pivot support elements 1318a, 1318b can be used to provide a height-adjustable rotatable coupling between the distal ends of the adjustable pivot bar 1316. The adjustable pivot bar 1316 can be the same as or similar as the adjustable pivot bar 1216 of FIG. 12.

As illustrated in FIG. 13, the tow point aperture 1312 can be located further aft relative to the tow point 212 illustrated in FIG. 2. As noted previously above with respect to FIG. 12, the aft shift of approximately 20% for the location of the tow point aperture 1312 (e.g., an aft shift in the horizontal plane, such as the horizontal plane of the planar surface 1315) can be seen to reduce the weight of the TVG towed apparatus 1300, to increase the strength or rigidity of the TVG towed apparatus 1300, and/or to improve the responsiveness of the canard wings 1320a, 1320b.

In one illustrative example, the TVG tow frame 1300 depicted in FIG. 13 can be the same as or similar to one or more (or all) of the TVG tow frame 200 of FIG. 2, the TVG tow frame 300 of FIGS. 3-4, the TVG tow frame 500 of FIGS. 5-6, the TVG tow frame 700 of FIG. 7, the TVG tow frame 800 of FIG. 8, the TVG tow frame 900 of FIG. 9, the TVG tow frame 1000 of FIG. 10, the TVG tow frame 1100 of FIG. 11, the TVG tow frame 1200 of FIG. 12, etc. In some aspects, the TVG tow frame 1300 and its respective components shown in FIG. 13 may each be the same as or similar to the corresponding components in FIGS. 2-12 and/or in any other embodiments described herein and/or depicted in FIGS. 2-12.

While the present disclosure has been described with reference to various embodiments, it will be understood that these embodiments are illustrative and that the scope of the disclosure is not limited to them. Those skilled in the art will appreciate that variations from the specific embodiments disclosed above are contemplated by the invention. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

In the foregoing description, aspects of the present disclosure are described with reference to specific examples thereof, but those skilled in the art will recognize that the present disclosure is not limited thereto. Thus, while illustrative aspects and examples of the present disclosure have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects and examples can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects and examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A transverse gradiometer (TVG) towed apparatus, comprising:
a tow module comprising at least a tow point coupler;
a first wing surface that is pitch-adjustable based on rotation about a leading edge of the first wing surface; and
a second wing surface that is pitch-adjustable based on rotation about a leading edge of the second wing surface, and wherein a pitch of the second wing surface is adjustable independently from a pitch of the first wing surface,
wherein the first wing surface is disposed on a planar surface coupled between a first longitudinal frame arm and a second longitudinal frame arm.

2. The TVG towed apparatus of claim 1, wherein the second wing surface is disposed on the planar surface.

3. The TVG towed apparatus of claim 1, further comprising:
a pitch-adjustable rear wing surface coupled between the first longitudinal frame arm and the second longitudinal frame arm.

4. The TVG towed apparatus of claim 1, further comprising one or more yaw control surfaces pivotably coupled to the planar surface, wherein each yaw control surface of the one or more yaw control surfaces:
is perpendicular to the planar surface;
is pivotable in a first direction of deflection to yaw the TVG towed apparatus in a first yaw direction; and
is pivotable in a second direction of deflection to yaw the TVG towed apparatus in a second yaw direction.

5. The TVG towed apparatus of claim 1, further comprising a first magnetometer coupled to the first longitudinal frame arm and a second magnetometer coupled to the second longitudinal frame arm, wherein the first and second magnetometers are included in a horizontal magnetic gradiometer.

6. The TVG towed apparatus of claim 1, further comprising:
a first magnetometer towfish rigidly coupled to the first longitudinal frame arm; and
a second magnetometer towfish rigidly coupled to the second longitudinal frame arm;
wherein the first magnetometer towfish is parallel to the first longitudinal frame arm and the second magnetometer towfish is parallel to the second longitudinal frame arm.

7. The TVG towed apparatus of claim 6, wherein:
the first magnetometer towfish comprises one or more magnetometers disposed within a first towfish housing that includes a first dihedral fin disposed at a first dihedral angle with respect to the planar surface; and
the second magnetometer towfish comprises one or more magnetometers disposed within a second towfish housing that includes a second dihedral fin disposed at a second dihedral angle with respect to the planar surface.

8. The TVG towed apparatus of claim 7, wherein the first dihedral angle is equal to the second dihedral angle.

9. The TVG towed apparatus of claim 7, wherein:
the first and second dihedral angles are fixed angles; and
the first and second dihedral fins are rigidly affixed to the respective first and second magnetometer towfish.

10. The TVG towed apparatus of claim 7, wherein a pitch-adjustable rear wing surface is rotatably coupled between the first dihedral fin and the second dihedral fin, and wherein rotation of the pitch-adjustable rear wing surface causes a pitch adjustment of the rear wing surface.

11. The TVG towed apparatus of claim 10, wherein:
a first rotatable coupler is rigidly affixed to an inner-facing surface of the first dihedral fin;
a second rotatable coupler is rigidly affixed to an inner-facing surface of the second dihedral fin; and
the pitch-adjustable rear wing surface is rigidly coupled between the first rotatable coupler and the second rotatable coupler.

12. The TVG towed apparatus of claim 1, wherein a pitch-adjustable rear wing surface is perpendicular to the first and second longitudinal frame arms.

13. The TVG towed apparatus of claim 1, wherein:
the first and second wing surfaces are disposed toward the tow module; and
a pitch-adjustable rear wing surface is disposed away from the tow module.

* * * * *